US008858333B2

(12) United States Patent
Vange

(10) Patent No.: US 8,858,333 B2
(45) Date of Patent: Oct. 14, 2014

(54) METHOD AND SYSTEM FOR MEDIA CONTROL

(75) Inventor: Mark Vange, Scottsdale, AZ (US)

(73) Assignee: Electronic Arts, Inc., Redwood City, CA (US)

(*) Notice: Subject to any disclaimer, the term of this patent is extended or adjusted under 35 U.S.C. 154(b) by 50 days.

(21) Appl. No.: 13/437,790

(22) Filed: Apr. 2, 2012

(65) Prior Publication Data

US 2012/0277000 A1   Nov. 1, 2012

Related U.S. Application Data

(60) Provisional application No. 61/471,008, filed on Apr. 1, 2011, provisional application No. 61/471,068, filed on Apr. 1, 2011, provisional application No. 61/471,131, filed on Apr. 2, 2011, provisional application No. 61/471,133, filed on Apr. 2, 2011, provisional application No. 61/481,972, filed on May 3, 2011.

(51) Int. Cl.
*G06F 15/16* (2006.01)
*A63F 13/90* (2014.01)
*A63F 13/20* (2014.01)

(52) U.S. Cl.
CPC ............... *A63F 13/06* (2013.01); *A63F 13/08* (2013.01); *A63F 2300/204* (2013.01); *A63F 2300/301* (2013.01)
USPC .............. 463/37; 463/30; 463/36; 463/39; 463/40; 463/41; 463/42; 463/43; 345/174

(58) Field of Classification Search
USPC .................. 463/1, 30, 31–34, 36, 37, 39–43; 345/174
See application file for complete search history.

(56) References Cited

U.S. PATENT DOCUMENTS

| 6,512,838 | B1 * | 1/2003 | Rafii et al. ..................... 382/106 |
| 8,000,924 | B2 * | 8/2011 | Sato et al. ...................... 702/153 |
| 8,050,891 | B2 * | 11/2011 | Podoloff et al. ............... 702/191 |
| 8,210,947 | B2 * | 7/2012 | Nanba .............................. 463/42 |
| 8,284,157 | B2 * | 10/2012 | Markovic et al. ............. 345/156 |
| 8,334,842 | B2 * | 12/2012 | Markovic et al. ............. 345/158 |
| 2007/0285386 | A1 * | 12/2007 | Lim et al. ....................... 345/156 |
| 2011/0066684 | A1 * | 3/2011 | Dorso et al. ................... 709/204 |
| 2011/0070952 | A1 * | 3/2011 | Nanba .............................. 463/42 |
| 2011/0175810 | A1 * | 7/2011 | Markovic et al. ............. 345/158 |
| 2011/0190061 | A1 * | 8/2011 | Takeda et al. ................... 463/39 |
| 2012/0208639 | A1 * | 8/2012 | Reynolds et al. ............... 463/36 |
| 2012/0232976 | A1 * | 9/2012 | Calman et al. ............. 705/14.25 |

* cited by examiner

*Primary Examiner* — Sunit Pandya
(74) *Attorney, Agent, or Firm* — The Noblitt Group, PLLC

(57) ABSTRACT

Various embodiments provide a motion-based media control system comprising a motion-based controller comprising a motion sensor; a media center comprising a display; a network in communication with the media center and a server; a network in communication with the motion-based controller and the server; and an application configured to execute on the motion-based controller and to capture movement coordinates from the motion sensor of the motion-based controller, and to send the movement coordinates to the server. Various embodiments provide an optical-based media control system comprising an optical-based controller comprising a touch screen and an image sensor on a surface opposite of the touch screen.

20 Claims, 19 Drawing Sheets

METHOD AND SYSTEM FOR MEDIA CONTROL

CROSS-REFERENCE TO RELATED APPLICATIONS

The present application claims all benefits of and priority to Provisional Patent Application Ser. No. 61/471,008, entitled Systems and Methods for Motion-Based Media Control, filed on Apr., 1, 2011 and incorporates the disclosure of this provisional application by reference in its entirety.

The present application claims all benefits of and priority to Provisional Patent Application Ser. No. 61/471,068, entitled Systems and Methods for Remote. Applications Display, filed on Apr., 1, 2011 and incorporates the disclosure of this provisional application by reference in its entirety.

The present application claims all benefits of and priority to Provisional Patent Application Ser. No. 61/471,131, entitled Systems and Methods for Optical-Based Media Control, filed on Apr., 2, 2011 and incorporates the disclosure of this provisional application by reference in its entirety.

The present application claims all benefits of and priority to Provisional Patent Application Ser. No. 61/471,133, entitled Systems and Methods for Media Synchronization, filed on Apr., 2, 2011 and incorporates the disclosure of this provisional application by reference in its entirety.

The present application claims all benefits of and priority to Provisional Patent Application Ser. No. 61/481,972, entitled Systems and Methods for Media Synchronization, filed on May, 3, 2011 and incorporates the disclosure of this provisional application by reference in its entirety.

BACKGROUND

Typically a game controller is a device connected to a game source, such as, a game console, a computer, or an entertainment system to provide user input to a video game. In general, the game controller is connected to the game source by a cord or a wire, however, the wireless game controller has become a popular choice for connection with the game source.

Game controllers have various forms, such as, for example, a joystick, a game pad, a keyboard, a steering wheel, numb chucks, roller balls, and combinations thereof. The common usage of the game controller is to provide control to the user of an object or a character in a video game.

As video games continue to change, new approaches to game controllers are needed. In addition, as delivery of media content to a user continues to improve, new challenges are created for interfacing game controllers with video games. With the increase of the number of delivery paths by which media content can flow to the user, new challenges have been created for synchronizing the user's controller with the media content.

SUMMARY

Various embodiments provide a motion-based media control system comprising a motion-based controller comprising a motion sensor; a media center comprising a display; a network in communication with the media center and a server; a network in communication with the motion-based controller and the server; and an application configured to execute on the motion-based controller and to capture movement coordinates from the motion sensor of the motion-based controller, and to send the movement coordinates to the server.

Various embodiments provide an optical-based media control system comprising an optical-based controller comprising a touch screen and an image sensor on a surface opposite of the touch screen; a media center comprising a display; a network in communication with the media center and a server; a radio network in communication with the optical-based controller and the server; and an application configured to execute on the optical-based controller and to capture images of the display in relation to movement of the optical-based controller, to calculate movement coordinates (motion-based coordinates) from the captured images, and to send the movement coordinates to the server.

Various embodiments provide a software application for execution on a hand-held smart device. The application can comprise a routine to control of operation of a camera located on the smart device; a routine to capture images at a rate with the camera of a fixed target; a routine to calculate movement coordinates from the images; and a routine to broadcast of the movement coordinates to a server via a wireless network. In some embodiments, the fixed target is a display. The server can provide media content to the display. The movement coordinates can be received by the server effect a feature in the media content. The media content can be a streaming video game and the feature is a movement of least one of a character and an object in the video game.

Various embodiments provide a software application for execution on a hand-held smart device. The application can comprise a routine to control of operation of a motion sensor located in the smart device; a routine to capture movement coordinates at a rate from the motion sensor; and a routine to broadcast of the movement coordinates to a server via a wireless network.

Various embodiments provide a software application for execution on a hand-held smart device. The application can comprise a routine to control of operation of a camera located on the smart device; a routine to capture images at a rate with the camera of a fixed target and convert the images into movement coordinates; and a routine to broadcast of the movement coordinates to a server via a wireless network. In some embodiments, the fixed target is a display. The server can provide media content to the display. The movement coordinates can be received by the server effect a feature in the media content. The media content can be a streaming video game and the feature is a movement of least one of a character and an object in the video game.

Various embodiments provide a method of controlling a feature on a display of a media system. The method can include the steps of providing an application on a smart device comprising a touch screen and an image sensor on a surface opposite of the touch screen; executing the application to capture images with the image sensor of a fixed display of a media system in relation to movement of the smart device; converting the captured images into movement coordinates; sending the movement coordinates to a host; and receiving from the host an effect to a feature on the display.

Various embodiments provide a method of controlling a feature on a display of a media system. The method can include the steps of providing an application on a smart device comprising a motion sensor; executing the application to capture movement coordinates from the motion sensor of the motion-based controller in relation to movement of the smart device; sending the movement coordinates to a host; and receiving from the host an effect to a feature on the display.

Various embodiments provide methods of synchronizing an applications controller with media content from a host. A method can include the steps of providing an application configured to identify a cue and to record a response to the at least one cue; receiving the cue from the media content with the applications controller; recording a response to the cue by a user of the applications controller; determining a time interval between the receiving the cue and the recording the response; and aligning a clock in the application controller with a clock on the host. The method can include the step of synchronizing the media content from the host with the application controller.

DRAWINGS

The present disclosure will become more fully understood from the specification and the accompanying drawings, wherein.

Figure 15:
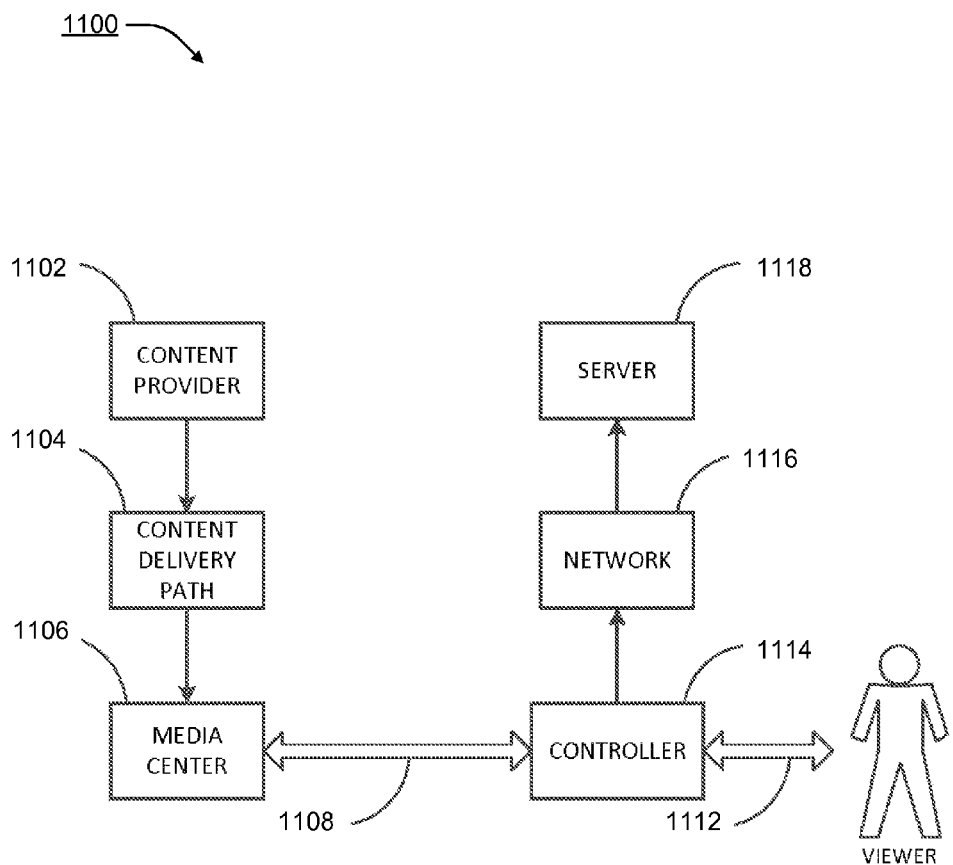
FIG. 15 is a functional block diagram illustrating a media synchronization system, according to various embodiments.
Figure 17A:
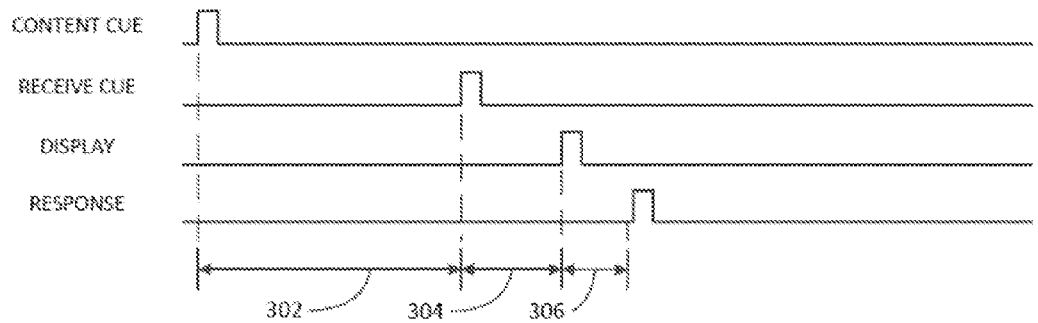
Figure 17B:
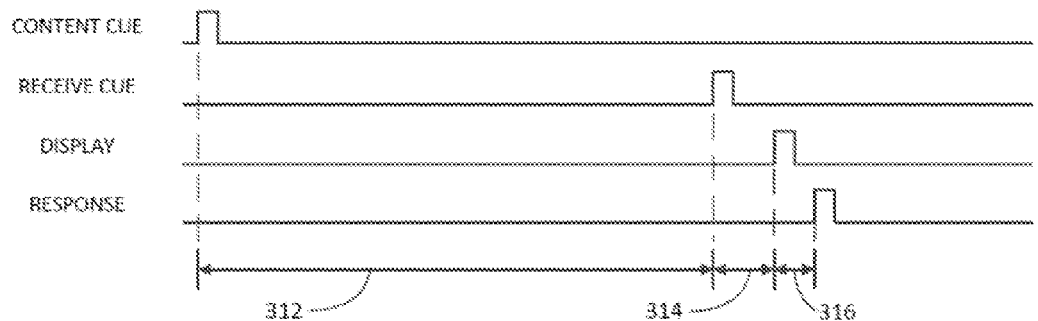
Figure 17C:
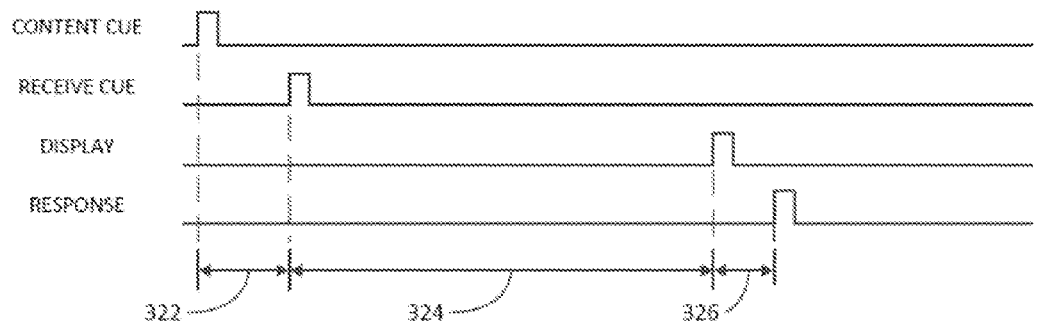
Figure 18:
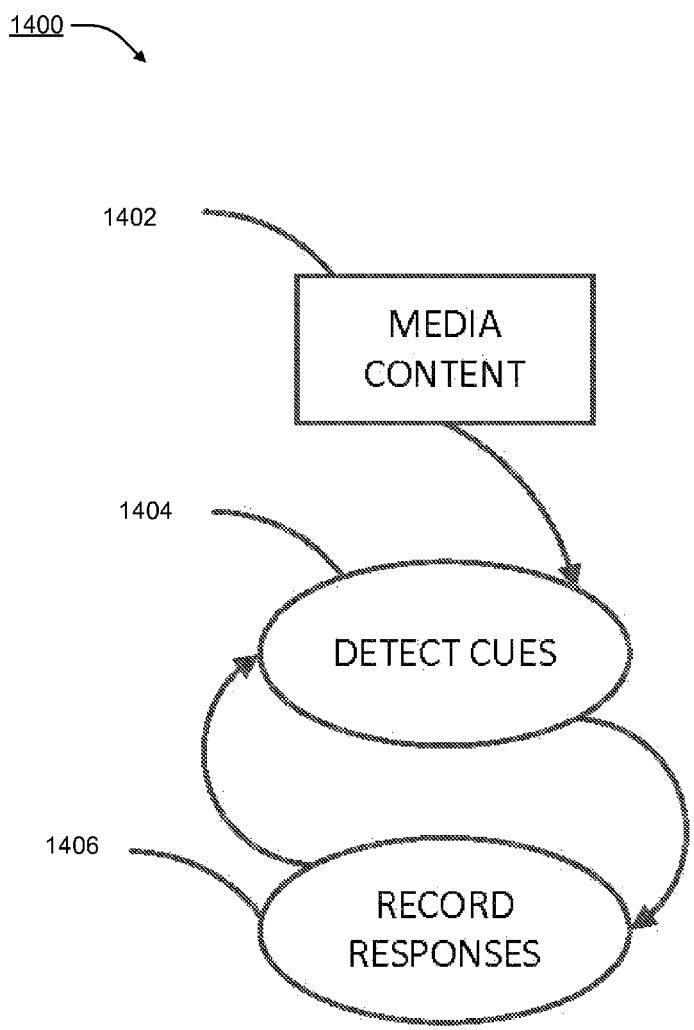
Figure 19:
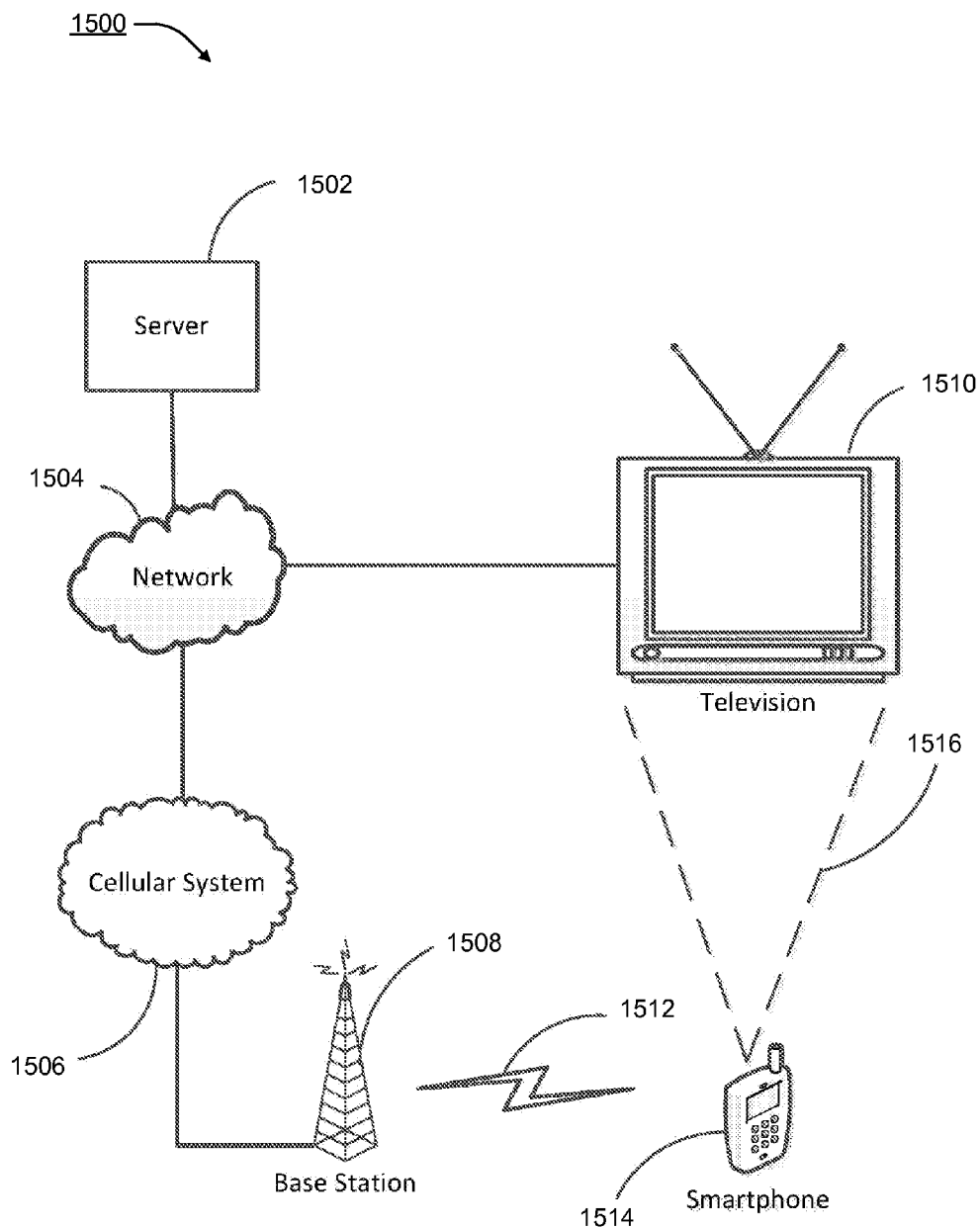

FIG. 17A, 17B, and 17C are graphs illustrating timing diagrams describing sequences of operations by the system of FIG. 15;

FIG. 18 is a data flow diagram illustrating for synchronizing to media content, according to various embodiments; and FIG. 19 illustrates a media synchronization system with media content delivered over a network, according to one embodiment.

DESCRIPTION

The following description is merely exemplary in nature and is in no way intended to limit the various embodiments, their application, or uses. As used herein, the phrase "at least one of A, B, and C" should be construed to mean a logical (A or B or C), using a non-exclusive logical or. As used herein, the phrase "A, B and/or C" should be construed to mean (A, B, and C) or alternatively (A or B or C), using a non-exclusive logical or. It should be understood that steps within a method may be executed in different order without altering the principles of the present disclosure.

The drawings described herein are for illustrative purposes only of selected embodiments and not all possible implementations, and are not intended to limit the scope of any of the various embodiments disclosed herein or any equivalents thereof. It is understood that the drawings are not drawn to scale. For purposes of clarity, the same reference numbers will be used in the drawings to identify similar elements.

The various embodiments may be described herein in terms of various functional components and processing steps. It should be appreciated that such components and steps may be realized by any number of hardware components configured to perform the specified functions. For example, various embodiments may employ various media content devices, video displays, streaming content sources, gaming software, and the like, which may carry out a variety of functions under the control of one or more control systems or other control devices. In addition, the embodiments may be practiced in any number of media content contexts and that the various embodiments relating to a method and system for hand-held controller, as described herein are merely indicative of exemplary applications for the invention. For example, the principles, features and methods discussed may be applied to any media source and/or video gaming device. Any of the aspects; features, functions, or applications, of any controller, described herein, can be combined or incorporated into any of the other controllers, described herein.

Various embodiments provide media control systems configured to control various aspects of the media center through the use of a hand-held controller. In one embodiment, the hand-held controller is a smart phone comprising an app configured for communication between the smart phone and the media center. In an aspect of this embodiment the hand-held controller can emulate a game controller pad to allow user to control an object and/or a character in a videogame. In one embodiment, the handheld controller is a tablet, such as, for example, an iPad, comprising an app configured for communication between the tablet and media center. In one embodiment the handheld controller is a personal data assistant ("PDA") comprising an application configured for communication between the PDA and a media center.

In various embodiments, an optical-based media control system controls various aspects of a media center through the use of an optical sensor in a hand-held or portable controller. The user can control media center functions by movements of the controller and its optical sensor relative to a fixed reference. The movements can include any movement of the controller in space, such as for example, but not limited to, changes in position, motions, displacement, and combinations thereof. Such movements are detected by an optical sensor or an image capture device within the controller. Application software on the controller translates the relative movements of the image with respect to the controller into commands which are sent to, and performed by, the media center or its components.

Application software resident or loaded on the controller establishes a connection to the media center either directly or through an intermediary device, such as, for example, a computer server on a network. In one embodiment, application software may be resident or pre-installed on the controller. In one embodiment, application software may be loaded, downloaded, or installed on the controller. In one embodiment, a portion of the application software may be resident or pre-installed on the controller and the remainder of the application software may be loaded, downloaded, or installed on the controller at a later point in time, such as, for example, upon connection to a game to be played on the media center, or upon payment for use of the software application, or held temporarily on the controller based on a subscription.

In some embodiments, the controller can be a smartphone, a mobile phone, a cellular phone, a PDA, a tablet computer, a netbook computer, a personal pocket computer, a universal remote controller, an iPad, an Android based tablet, or any similar device now known or developed in the future. In various embodiments, the optical-based controller comprises an interactive touch video screen, a means to connect to a cloud, an imaging device on a surface opposite the video screen, and a means to run the application software.

In some embodiments, the media center can be a home theatre, an entertainment system, a cinema, a video game device, or any similar device now known or developed in the future. In some embodiments, the intermediary device can be a computer server, computer program running a service, a computer dedicated to running a service, hardware/software system or any similar device now known or developed in the future. In some embodiments, a network can be a radio network, a cellular network, the Internet, a local area network ("LAN"), a wide area network ("WAN"), or any similar device now known or developed in the future.

The media center can have application software resident or loaded to enable coupling with the controller directly or through the computer server. The coupling can be an electronic communication connection, or any link or pathway between two or more devices to facilitate exchange of information, data or commands.

The application software (or "app") on the controller receives optical information or image either directly or through other controller software or a controller operating system. The controller can receive the optical information or image from an image sensor, imaging device, a CCD, a camera, a video camera, combinations thereof, or any similar device now known or developed in the future. The app processes the image to extract features of an object that can be used to track relative motion and/or position with respect to the controller. The features can include, but not limited to, edge detection, corner detection, intersections, boundaries, embedded features, and the like. As the controller is moved relative to the object, the position of the object shifts in the field of view of the image sensor or camera of the controller. By comparing one or more features or attributes of the image from one frame or time with subsequent or later frames, the app translates the relative motion information into one or more function commands for the media center. The commands are sent to the media center through the previously established coupling.

To affect control of media center functions, motions with rates of movement or accelerations above a predetermined or selectable threshold in one or more directions can be required to prevent unintentional or inadvertent functions from being commanded. Relative motions beyond a predetermined or selectable threshold can be required to overcome jitter, tremor or shaking by the user holding the controller. Relative motions can be in conjunction with a button push, touchscreen touch, or voice command on the controller to prevent unintended functions from being commanded. Motions can be defined with the completion of the movement at or near the initial position or a return to a starting point to avoid an unintended function or command activation.

In some embodiments, the methods and systems for the optical-based media control is enabled by apps running on computers in the various media center, controller, and server devices. The apps can be application of computer software, a computer program, a computer code, or a smart phone application. The app can be executed and/or performed on one or more computers, such as, for example, but not limited to microprocessors, microcomputers, processors, central processing units, computing elements, or any similar device now known or developed in the future.

By the actions of a person moving the hand-held or portable controller in any direction or manner, such as, for example, rotary motion, linear motion, up-down motion, side-to-side motion, fore-aft motion, or any other motion or combination of motions, relative to a fixed or a static object can effect a preselected function of the media center. The functions affected are those that can be available on the media center or any of the media center components, either through native capability or by added software, such as, and app or application software. The preselected function can be, for example, volume control, channel selection, fast-forward, pause, record, input source selection, reverse, mute, audio effects, and the like of the media center. Various examples of the media center can include, is not limited to television, digital video recorder, set-top box, cable modem, satellite receiver, network bridge, digital video disk recorder/player, video cassette recorder, compact disk player, receiver, a video appliance or combinations thereof.

Various embodiments provide an optical-based media control system comprising an optical-based controller comprising a touch screen and an image sensor on a surface opposite of the touch screen; a media center comprising a display; a network in communication with the media center and a server; a radio network in communication with the optical-based controller and the server; and an application configured to execute on the optical-based controller and to capture images of the display in relation to movement of the optical-based controller, to calculate movement coordinates (motion-based coordinates) from the captured images, and to send the movement coordinates to the server.

In some embodiments, control system can comprise media content residing on the server and configured for delivery to the media center. The movement coordinates received by the server can affect a feature in the media content. The media content can be a streaming video game and the feature can be a movement of least one of a character and an object in the video game.

In some embodiments, the application is configured to provide an interactive game controller layout on the touch screen. The control system comprise a cue configured to be sent by the media content and received the optical-based controller. In some embodiments, the optical-based controller is configured to provide a different interactive game controller layout on the touchscreen upon receipt of the cue. The optical-based controller can be configured receive the cue and adjust at least one feature to compensate for a change in system latency.

In some embodiments, the optical-based controller comprises a motion sensor and the application is configured communicate movement of the optical-based controller to the server. The movement received by the server can affect a feature in the media content. The media content can be a streaming video game and the feature can be a movement of least one of a character and an object in the video game.

In some embodiments, the optical-based includes a vibration device and the application can be configured to provide a haptic effect to the optical-based controller. The haptic effect can be initiated by cue configured to be sent by the media content and received the optical-based controller.

Various embodiments provide a method of controlling a feature on a display of a media system. The method can include the steps of holding an optical-based controller comprising a an image sensor; executing on the optical-based controller an application to capture images of a display in relation to movement of the optical-based controller; targeting the image sensor at the display; moving the optical-based controller in space; capturing images of the display; converting the captured images into movement coordinates; sending the movement coordinates to a server; and communicating from the server an effect to a feature on the display.

In some embodiments, the method can include the step of providing media content from the server to the display. The media content can be a streaming video game and the feature can be a movement of least one of a character and an object in the video game.

In some embodiments, the application is configured to provide an interactive game controller layout on a touch screen of the controller. The method can include the step of receiving with the optical-based controller a cue sent by the media content. The method can include the step of providing a different interactive game controller layout on the touchscreen upon the receiving the cue. The method can include the step of adjusting at least one feature on the optical-based controller to compensate for a change in system latency upon the receiving the cue.

In some embodiments, the optical-based controller further comprises a motion sensor and the application is configured communicate movement of the optical-based controller to the server. The method can include the steps of capturing movement coordinates with the motion sensor; sending the movement coordinates to the server; and communicating from the server an effect to a feature on the display.

In some embodiments, the optical-based controller can comprise a vibration device and the application is configured to provide a haptic effect to the optical-based controller. The method can include the steps of receiving with the optical-based controller a cue sent by the server; and initiating the haptic effect within the optical-based controller.

Various embodiments provide a software application for execution on a hand-held smart device. The application can comprise a routine to control of operation of a camera located on the smart device; a routine to capture images at a rate with the camera of a fixed target; a routine to calculate movement coordinates from the captured images; and a routine to broadcast of the movement coordinates to a server via a wireless network. In some embodiments, the fixed target is a display. The server can provide media content to the display. The movement coordinates can be received by the server effect a feature in the media content. The media content can be a streaming video game and the feature is a movement of least one of a character and an object in the video game.

The application can comprise a routine to provide an interactive game controller layout on touch screen of the smart device. The application can comprise a command to provide a different interactive game controller layout on the touchscreen upon the receiving a cue received from the server.

The application can comprise a routine to capture movement coordinates at a rate from a motion sensor in the smart device; and a routine to broadcast of the movement coordinates to a server via wireless network. In some embodiments, the fixed target is a display and the server provides media content to the display; and wherein movement coordinates received by the server affect a feature in the media content. The media content can be a streaming video game and the feature can be a movement of least one of a character and an object in the video game. The application can comprise a routine to calculate a position of the hand-held device in relation to the fixed target; and a routine to broadcast the position to the server via the wireless network.

Various embodiments provide a method of controlling a feature on a display of a media system. The method can include the steps of providing an application on a smart device comprising a touch screen and an image sensor on a surface opposite of the touch screen; executing the application to capture images with the image sensor of a fixed display of a media system in relation to movement of the smart device; calculating movement coordinates from the captured images; sending the movement coordinates to a host; and receiving from the host an effect to a feature on the display.

In some embodiments, the method can include the step of providing media content from the host to the display. The media content can be a streaming video game and the feature is a movement of least one of a character and an object in the video game. The method can include the step of executing the application to provide an interactive game controller layout on the touch screen. The method can include the step of receiving, in the application, a cue sent by the media content. The method can include the step of executing the application to provide a different interactive game controller layout on the touchscreen, upon the receiving the cue. The method can include the step of executing the application to adjust at least one feature on smart device to compensate for a change in system latency, upon the receiving the cue.

In some embodiments, the smart device further comprises a motion sensor and the application is configured capture movement coordinates of the smart device. The method can include the steps of sending the movement coordinates to the host; and receiving from the host an effect to a feature on the display. The smart device further can include a vibration device and the application can be configured to provide a haptic effect to the smart device. The method can include the steps of streaming media content from the host; receiving, in the application, a cue sent by the media content; and initiating application to provide the haptic effect to the smart device.

In various embodiments, a motion-based media control system controls various aspects of a media center through the use of motion sensors in a hand-held or portable controller. The user can control media center functions by movements of the controller and its motion sensors relative to a fixed reference. The movements can include any movement of the controller in three dimensional space, such as for example, but not limited to, changes in position, motions, displacement, and combinations thereof. Such movements are detected by motion sensors within the controller. Application software on the controller translates the movements into commands which are sent to, and performed by, the media center or its components.

The application software or app on the controller receives motion information from embedded or internal motion sensors either directly or through other controller software or a controller operating system. The controller can receive the motion information from, for example, a gyroscope, microelectromechanical systems, accelerometers, combinations thereof, or any similar device now known or developed in the future. The app translates the motion information into one or more function commands for the media center. The commands are sent to the media center through the previously established coupling.

To effect control of media center functions, motions with accelerations above a predetermined threshold in one or more directions may be required to prevent unintentional or inadvertent functions from being commanded. Relative motions beyond a predetermined or selectable threshold can be required to overcome jitter, tremor or shaking by the user holding the controller. Relative motions can be in conjunction with a button push, touchscreen touch, or voice command on the controller to prevent unintended functions from being commanded. Motions can be defined with the completion of the movement at or near the initial position or a return to a starting point to avoid an unintended function or command activation.

In some embodiments, the methods and systems for the motion-based media control is enabled by apps running on computers in the various media center, controller, and server devices. The apps can be application of computer software, a computer program, a computer code, or a smart phone application. The app can be executed and/or performed on one or more computers, such as, for example, but not limited to microprocessors, microcomputers, processors, central processing units, computing elements, or any similar device now known or developed in the future.

By the actions of a person moving the hand-held or portable controller in any direction or manner, such as, for example, rotary motion, linear motion, up-down motion, side-to-side motion, fore-aft motion, or any other motion or combination of motions, relative to a fixed or a static object can effect a preselected function of the media center. The functions affected are those that can be available on the media center or any of the media center components, either through native capability or by added software, such as, and app or application software. The preselected function can be, for example, volume control, channel selection, fast-forward, pause, record, input source selection, reverse, mute, audio effects, and the like of the media center. Various examples of the media center can include, is not limited to television, digital video recorder, set-top box, cable modem, satellite receiver, network bridge, digital video disk recorder/player, video cassette recorder, compact disk player, receiver, a video appliance or combinations thereof.

Various embodiments provide a motion-based media control system comprising a motion-based controller comprising a motion sensor; a media center comprising a display; a network in communication with the media center and a server; a radio network in communication with the motion-based controller and the server; and an application configured to execute on the motion-based controller and to capture movement coordinates from the motion sensor of the motion-based controller, and to send the movement coordinates to the server.

In some embodiments, media content can be residing on the server and configured for delivery to the media center. The movement coordinates received by the server can affect a feature in the media content. The media content can be a streaming video game and the feature can be a movement of least one of a character and an object in the video game.

In some embodiments, the application is configured to provide an interactive game controller layout on a touch screen of the controller. The control system can comprise a cue configured to be sent by the media content and received the optical-based controller.

The motion-based controller can be configured to provide a different interactive game controller layout on the touchscreen upon receipt of the cue. The motion-based controller can be configured receive the cue and adjust at least one feature to compensate for a change in system latency. The motion-based controller can comprise an image sensor and the application is configured communicate images of fixed object in relation to the motion-based controller. The movement coordinates, which are calculated by the controller using the images and are received by the server, can affect a feature in the media content. The media content can be a streaming video game and the feature can be a movement of least one of a character and an object in the video game. The motion-based controller can comprise a vibration device and the application can be configured to provide a haptic effect to the motion-based controller. The haptic effect can be initiated by cue configured to be sent by the media content and received the motion-based controller.

Various embodiments provide a software application for execution on a hand-held smart device. The application can comprise a routine to control of operation of a motion sensor located in the smart device; a routine to capture movement coordinates at a rate from the motion sensor; and a routine to broadcast of the movement coordinates to a server via a wireless network.

In some embodiments, the application is in communication with a media center comprising a display. The server can provide media content to the display. The movement coordinates received by the server can affect a feature in the media content. The media content can be streaming video game and the feature can be a movement of least one of a character and an object in the video game. The application can comprise a routine to provide an interactive game controller layout on a touch screen of the smart device. The application can comprise a command to provide a different interactive game controller layout on the touchscreen upon the receiving a cue received from the server.

Various embodiments provide a method of controlling a feature on a display of a media system. The method can include the steps of providing an application on a smart device comprising a touch screen and an motion sensor; executing the application to capture movement coordinates from the motion sensor of the motion-based controller in relation to movement of the smart device; sending the movement coordinates to a host; and receiving from the host an effect to a feature on the display.

In some embodiments, the method includes the step of providing media content from the host to the display. The media content can be streaming video game and the feature can be a movement of least one of a character and an object in the video game. The method can include the step of executing the application to provide an interactive game controller layout on the touch screen. The method can include the step of receiving, in the application, a cue sent by the media content. The method can include the step of executing the application to provide a different interactive game controller layout on the touchscreen, upon the receiving the cue. The method can include the step of executing the application to adjust at least one feature on smart device to compensate for a change in system latency, upon the receiving the cue.

In some embodiments, the smart device further comprises image sensor on a surface opposite of the touch screen and the application is configured capture the images from the smart device. The method can include the steps of calculating movement coordinates from the images; sending the movement coordinates to the host; and receiving from the host an effect to a feature on the display.

In some embodiments, the smart device can include a vibration device and the application can be configured to provide a haptic effect to the smart device. The method can include the steps of streaming media content from the host; receiving, in the application, a cue sent by the media content; and initiating application to provide the haptic effect to the smart device.

Various embodiments provide systems and methods for using a hand held multimedia device, such as those described herein, as a context-sensitive control surface with a two-way connection to a host, which allows context-sensitive reconfiguration of the control surface based on receiving a cue from the host. For example, the control surface may have a first set of buttons and/or gestures to control a character in an environment of a video game. In this example, when the character moves to a second environment, a cue is transmitted from the host to the controller which changes the control surface to a second set of buttons and/or gestures to control the character in the second environment.

In one embodiment, the control surface adapts to the context of the game. In other words, the changes the control surface as the game advances to different levels or as the user changes characters. In one embodiment, upon receipt of a cue by application in the controller, the buttons and/or gestures of the control surface rearrange to the needs of the environment of the media content. For example, if the user is playing a video game, the control surface is configured for control of the game environment and if the user changes to watching a game broadcast via satellite, a cue is received by the control rearranging the control surface to buttons and/or gestures for TV/audio-video control.

In some embodiments an app runs on the controller. This app running on the controller monitors communication port in the controller waiting for data from the host system. This data may include graphics to display on the controller, control area positioning information, and protocols for return communication back to the host system. A similar device driver runs on the host system, which, in addition, to handling communication between the host and controller also maintains the current known state of the controller. This allows the host to reconfigure the controller and real-time such that for instance a DVD player may display a menu for jumping to chapters while watching a movie but when the user is playing audio CD may display information about the artist and allow the users to jump to display store interface and allow the user to by other CDs from the same artist.

Another example of videogame, the control surface or at least a portion of the touch of the controller may display a joystick and fire buttons when actually playing again but may display setting control such as volume or screen brightness when the game has been paused. In still another example of a videogame, the control surface can display shoot and pass configurations for a user playing a position player a game of soccer and then changed to buttons and/or gestures for slide and/or catch when the user moves to play the goalie. In addition the control surface may be changed by particular movement that may be sensed by the host using motion control systems as described herein. In some embodiments when the host since into the controller may use a cue and adjust the sensitivity of the game to be in sync with network conditions for communicating with the host. For example, if the network slows down, then the sensitivity of the game slows so the user has a better experience as opposed to a choppy experience. In another example, the controller may have the motion control, as described here herein, to move a character in a first-person shooting videogame then use the optical-based motion to aim for example at eye level and a button to fire. However when the user changes weapons a cue comes from the host which changes the buttons for firing and may change the display for a more realistic experience of the weapon of choice.

Various embodiments, the game surface can be modified to a different environment or a new configuration by receiving a message sent from the host, by receiving an audio cue generated by the host, by use a time period, which is either counted by the host or the controller, by a motion, such as, a gesture, by moving a character to a different level of the game, by video cue for the host and the use of an optical-based controller. The game surface can be modified to a different environment or a new configuration, by request of the user. In some embodiments, a request that the user may be either a button on a gesture used with the controller or an audio command or combinations thereof. In one embodiment system allows for a request by user to be either by a gesture or use of a button on the controller and by audio command from the user, which allows the user to choose how to enter the request, which may be dependent on the environment and/or the mindset of the user.

In some embodiments, changing context of the control surface may be particularly useful in a fitness application. For example the control surface may be in one configuration for running and in another configuration for floor exercises or weightlifting. Another embodiment, the changing context of the control surface may be useful for board games, such as, those used in family fun nights. In another embodiment, the changing context of the control surface may be useful in the application of sports related video games. In another embodiment the changing context of the control surface may be particularly useful with puzzles, such as, bejeweled.

Various embodiments provide media control systems configured to control various aspects of the media center through the use of a controller. In one embodiment, the hand-held controller is a smart phone comprising an app configured for communication between the smart phone and the media center. In an aspect of this embodiment the controller can emulate a game controller pad to allow user to control an object and/or a character in a videogame.

In order to convey realistic sensations controller, as described herein, can be synchronized to the sights and sounds the user experiences during the play of videogame. Accordingly, such controllers may require relatively high bandwidth and low latency bidirectional and/or other supportive communication protocol with the host, for example, a gaming console, another computer executing game application, the cloud, a network connected to a server, or the like. If latency is too high the controller may be nonresponsive. According to various embodiments, controller described herein may be synchronized to adjust for latency. In one embodiment, the synchronization can be an update, which may be just a ping provided from the host or may be a particular gesture, which would describe the ping, which would be used for calibration. In one embodiment, the host has a constant measure of latency based on variations in network speed and adjusts sensitivity of the controller to best fit latency in real-time matter. In one example, latency may be tested every time a particular button on a control surface is utilized, in such an embodiment of this example, the shoot button may shoot at a target on the display of a video game and may also re-calibrate the sensitivity of the controller based on latency.

Various embodiments provide methods of synchronizing an applications controller with media content from a host. A method can include the steps of providing an application configured to identify a cue and to record a response to the at least one cue; receiving the cue from the media content with the applications controller; recording a response to the cue by a user of the applications controller; determining a time interval between the receiving the cue and the recording the response; and aligning a clock in the application controller with a clock on the host.

In some embodiments, the method can include the step of synchronizing the media content from the host with the application controller. In some embodiments, the method can include the step of displaying the media content on a media center. In some embodiments, the method can include the step of controlling the media content displayed on the media center with the applications controller. In some embodiments, the method can include the step of receiving a second cue from the media center with the applications controller. In some embodiments, the method can include the step of recording a response to the second cue by a user of the applications controller. In some embodiments, the method can include the step of determining a time interval between the receiving the cue and the recording the response. In some embodiments, the method can include the step of re-aligning a clock in the application controller with a clock on the host. In some embodiments, the method can include the step of aligning a clock in the application controller with a clock on the media center. In some embodiments, the method can include the step of connecting the application controller with the host over a cellular system.

In some embodiments, a cue sent to the application can initiate a haptic effect on the controller. In some embodiments, the haptic effect can provide a tactile effect on the controller. For example, the application can have a routine to control the vibration mechanism in a smart phone. The vibration mechanism can be used to create a haptic effect on the controller, For example, a haptic effect can used in a road racing video game to add the "feel of the road." In another example, the application can be interfaced with the vibration devise and with the motion sensor in the controller to create a haptic effect. A game, such as, golf or baseball, could use this application of the haptic effect, to give the user a crack of the bat feeling in a swing or the striking of the ball feeling during a golf swing when using the controller to define the swing of the user. In some embodiments, a haptic effect is initiated by a cue sent from the media content or a component of the media center to the application in the controller.

In various embodiments, a system synchronizes a controller to media content. Media content refers to any information such as entertainment, news, business applications, games, educational programming, advertising, sports, conferencing, or other applications that can be sent through, for example, the Internet, over the air, satellite, cable, cellular networks, telephony systems, compact disk, digital video disk and/or other delivery medium.

Media content make take any of a variety of paths from its source to a destination. The content may arrive at various destinations at different times due to propagation delays and other factors effecting content delivery. Some paths may delay the forwarding of the media content, the content may be time shifted at the destination, such as, for example, recorded in real time and played back at a later time, or the content stored until requested by a user. For instance, some media content may be viewed on the East Coast of the United States three hours before being seen on the West Coast. For media content that may result in response by a user, who also can be a user or an operator, the time interval from content presentation to user response may be needed. To compensate for the disparate date and/or time each user may see the media content, synchronization of the user's controller with the media content is desirable. For example, media content such as educational programming may deliver an examination requiring user responses within a given time period. To effectively provide a measure of the response time, the controller used by the user can need to be synchronized with the presentation of the examination. The controller can provide the time interval from presentation of the examination to response by the user, along with the response, to a server for recordation.

In various embodiments, a host can be any location from which media content is received. In some embodiments, a host is location were media content is stored, such as, for example, a server, the cloud, a computer, a game console, or a video appliance. In some embodiments, media center can receive media content from more than one host. In some embodiment, media content can be downloaded from the cloud or a server to a video appliance or game console for local use and storage of the media content.

Figure 1:
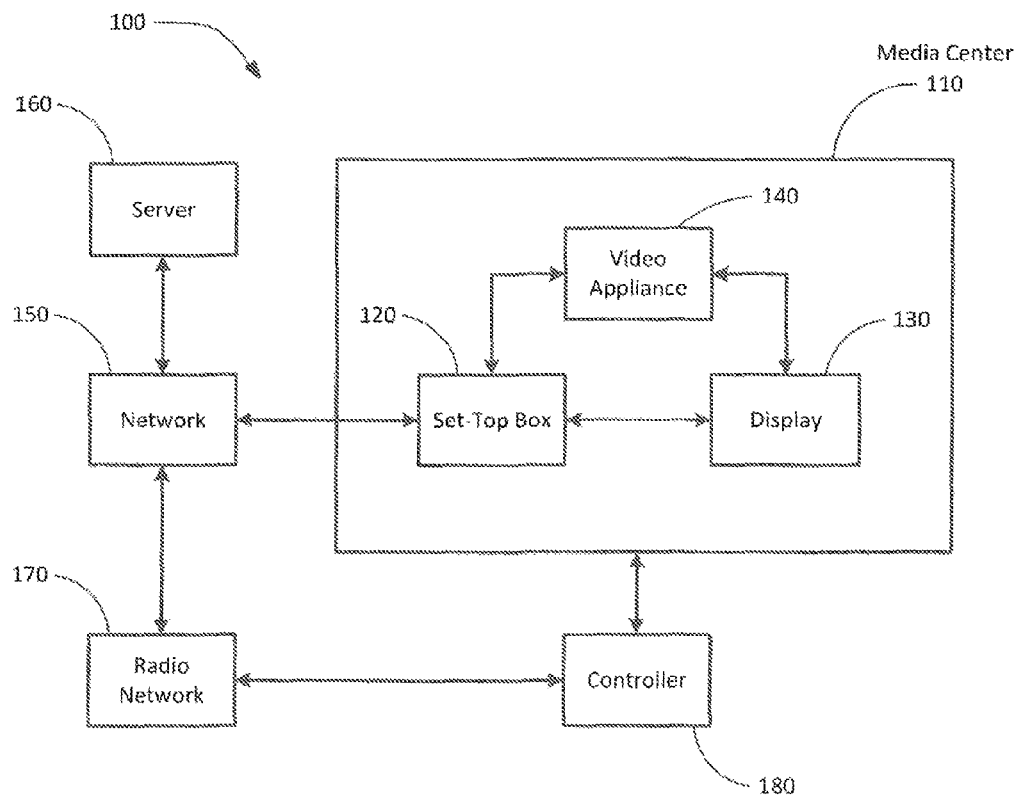
FIG. 1 is a functional block diagram illustrating an media control system, according to various embodiments.

In various embodiments, motion-based media control system 100, as illustrated in FIG. 1, performs the functions and/or achieves the results of the systems and methods for motion-based media control, as described herein. Motion-based media control system 100 can include media center 110, network 150, server 160, radio network 170, and controller 180. Media center 110 can include set-top box 120, display 130, and video appliance 140. The functions of set-top box 120, video appliance 140 and display 130 can be combined in any combination into one or more devices. For example, a network-enabled digital television can provide the functionality of set-top box 120, video appliance 140 and display 130 in a single unit. Alternatively, a digital video recording receiver can provide the functionality of set-top box 120 and video appliance 140 in a single device.

Set-top box 120 receives content and apps from network 150 and sends and receives data to or from network 150. Content can include media, multimedia, and entertainment, news, educational and informational programming. Content can be provided by cable, satellite, over-the-air broadcast, the Internet or other sources. Apps provide software for installation and/or execution on the set-top box to provide additional functionality. The apps can include business software, educational software, entertainment software and other application software in addition to a motion-based media control app. Data provides for the two-way communication of information from set-top box 120 to remote locations and devices.

Video appliance 140 can provide record, storage, playback and distribution capability. Video appliance 140 can include a digital video recorder (DVR), video distribution controller, video player, such as, for example, a video cassette recorder, DVD or Blu-Ray player, media computer, audio/video server or other audio and video functionality. In some embodiments, video appliance 140 can have the capability of receiving and executing apps.

Display 130 provides the user with visual images. Display 130 can be of any display type or technology, such as, for example, a television, a monitor, a computer display, a projector, a cathode ray tube (CRT), a front projection, a rear projection, a plasma, a liquid crystal display (LCD), a light emitting diode (LED), a digital light processing (DLP). Display 130 can be of any size, resolution or refresh rate.

Controller 180 can enable the user to select the media content for display and control display properties and characteristics, viewing options, features, functions, and/or the app to be executed. The media content can be supplied by, for example, cable, satellite, Internet, DVD, DVR, or a video streaming provider. The app maybe executed or run by set-top box 120, display 130, or video appliance 140. Controller 180 also allows the user to interact with the app or the media. Controller 180 is coupled to radio network 170 and media center 110 by a wired or wireless communication link.

Controller 180 can be a specific or universal remote control, keyboard, keypad, smartphone, media controller, touchpad, a mobile phone, a cellular phone, a PDA, a tablet computer, a netbook computer, a personal pocket computer, an iPad, an Android based tablet, or any similar device now known or developed in the future. Radio network 170 provides a coupling between controller 180 and network 150. Radio network 170 can be a cellular network or any wired or wireless service.

Network 150 provides a coupling between media center 110, radio network 170, and server 160. Network 150 can be a network of networks (e.g., the Internet), a local area network, a wide area network, or any facility that provides coupling of remote computing devices.

Server 160 contains the information to establish a coupling between controller 180 and media center 110. Server 160 can contain the address, such as, for example, Internet Protocol (IP), serial number, and/or identification number and/or name, such as, for example, domain name, or identity of media center 110 and of controller 180. Media center 110 can register its name, location, address or other identifying information with server 160. Registration can be performed by an app on media center 110. Apps on controller 180 accept user input to provide identifying information for server 160 to establish a coupling through server 160 or directly with media center 110.

In some embodiments, controller 180 comprises an optical sensing device that captures an image of an object selected or pointed to by user with optical-based controller 180A. The user's position and movements of optical-based controller 180A relative to the object can affect control of media center 110.

Figure 2:
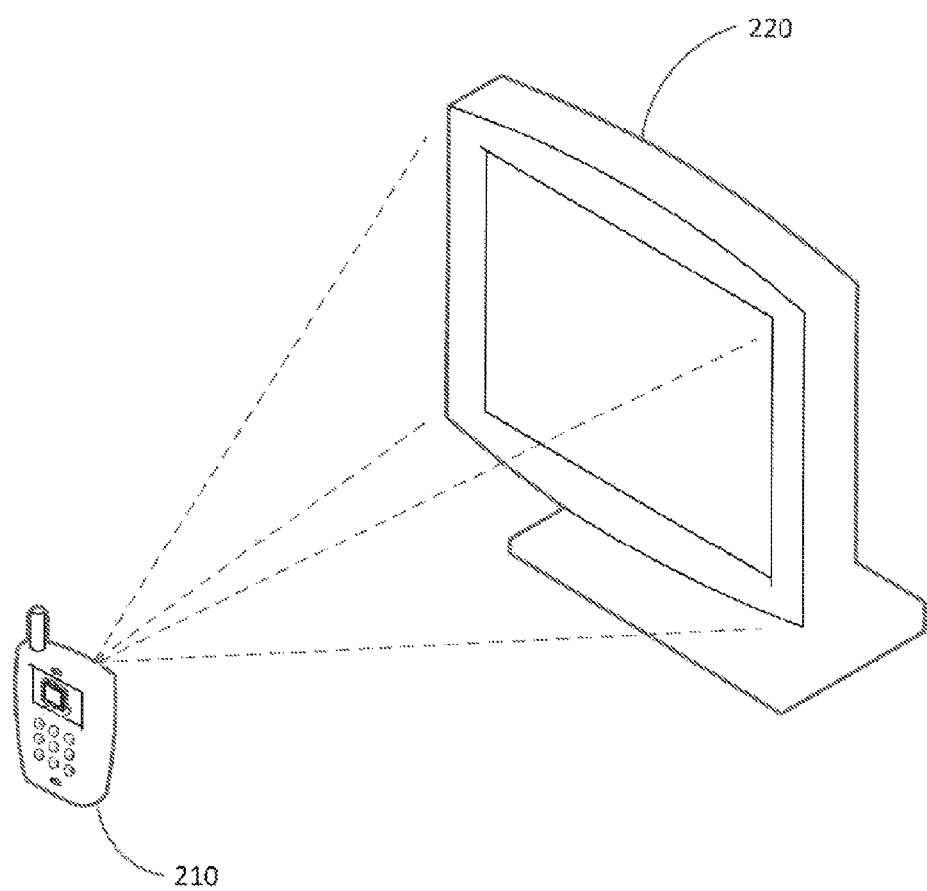
FIG. 2 illustrates a representation of image capture of an optical-based media controller, according to various embodiments.

To establish a frame of reference for detecting motion, the user operates the internal camera of the optical-based controller 180A, as illustrated in FIG. 2. The user points controller 210 to a fixed object such as display monitor 220. In one embodiment, display monitor 220 can perform the functionality of display 130, as described herein. In one embodiment, display monitor 220 can perform the functionality of one or more components of media center 110, as described herein. Under user control, optical-based controller 180A captures the image with the camera. The optical-based control app in optical-based controller 180A performs image processing to extract features that can be used to detect motion of the object in subsequent images or frames.

Figure 3:
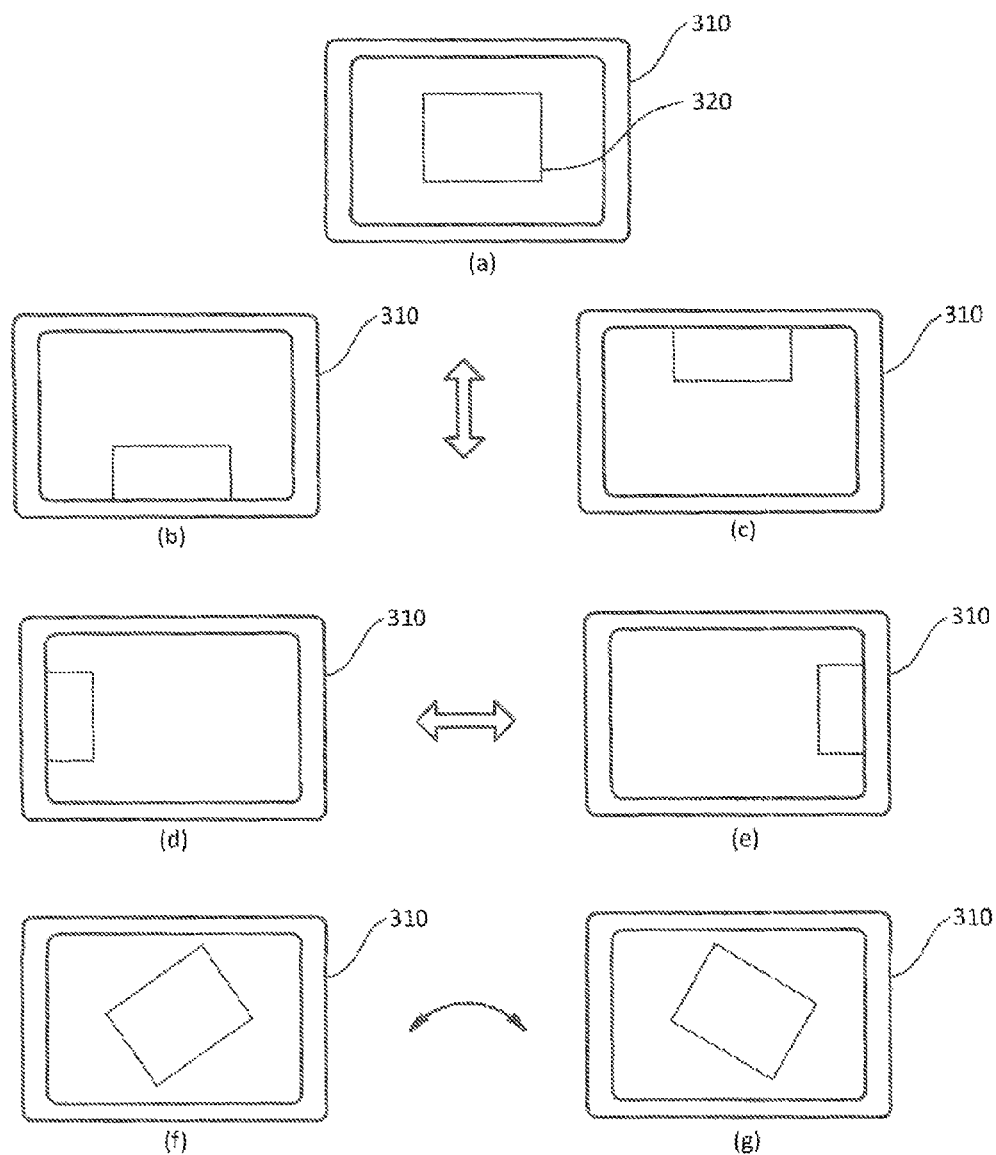
FIG. 3 illustrates a representation of motions detected by an optical-based media control system, according to various embodiments.

Movement of the image relative to the field of view of optical-based controller 180A is illustrated in FIG. 3. For example, in (a) the field of view of optical-based controller 180A of display 310 can be define by shape 320 in display 310 extracted by image processing and feature extraction of the captured image. As optical-based controller 180A is pointed in an upward direction (b), motion is detected by shape moving toward the bottom of display 310. As the controller is pointed downward (c), shape moves toward the top of display 310. Pointing the controller toward the right (d), shape moves to left on display 310. Pointing the controller toward the left (e), shape moves to the right on display 310. Rotating the controller clockwise (f) causes shape to rotate counter-clockwise on display 310. Rotating the controller counter-clockwise (g) causes shape to rotate clockwise on display 310.

The motions of optical-based controller 180A relative to the fixed object can be along or rotate about any axis. Optical-based controller 180A can move in any combination along an axis or in rotation about an axis. The functions controlled on media center 110 by optical-based controller 180A can be preset, preselected or can be user set or modified in the app on optical-based controller 180A or media center 110. The functions controlled on media center 110 by optical-based controller 180A can be selected by the user by performing the motion with optical-based controller 180A relative to an object and specifying or entering one or more functions to be commanded by that motion, for example, a learning mode. The functions or operations controlled by user motions of optical-based controller 180A can depend on the functions and operations of media center 110 and it component devices. The functions and operations controlled by user motions of optical-based controller 180A can depend on the apps running on controller 180. The functions and operations controlled by user motions of optical-based controller 180A can depend on the apps running on media center 110 or its component devices.

Figure 4:
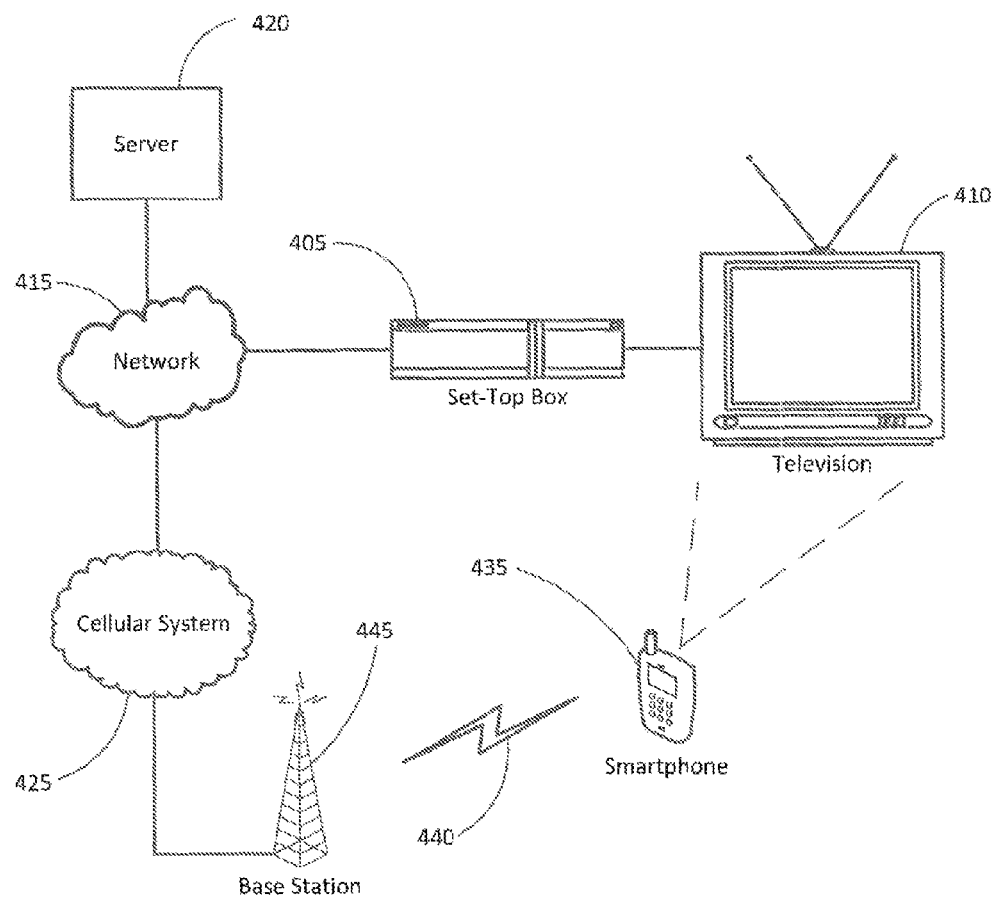
FIG. 4 illustrates an optical-based controller with coupling through a server, according to one embodiment.

In one embodiment of motion-based media control system 100, as illustrated in FIG. 4, television 410 provides the functionality of display 130, as described herein. Television 410 is coupled to set-top box 405. Set-top box 405 provides the video images for display on television 410. Television 410 and set-top box 405 comprise the functionality of media center 110. Set-top box 405 is coupled to network 415 which can be a cable provider, satellite provider, Internet provider or any combination of these or other electronic connectivity services. Set-top box 405 obtains content, apps and data through network 415. Set-top box can provide video recording and playback capability.

Cellular system 425 and base station 445 provide the functionality of radio network 170. Network 415 provides the functionality of network 150 and server 420 provides the functionality of server 160, as described herein. Smartphone 435 provides the functionality of controller 180A, as described herein. The user establishes a coupling through smartphone 435 by retrieving or entering an address, location, or other information identifying set-top box 405. Smartphone 435 communicates with server 420 through wireless link 440, base station 445, cellular network 425, and network 415 to establish the coupling with set-top box 405. Through one or more apps running on smartphone 435, the user selects the functions or family of functions to control by movement of smartphone 435.

Motions of smartphone 435 and the object image by the user relative to television 410 are translated into commands for set-top box 405. Smartphone 435 sends the commands to set-top box 405 through the coupling established by communication link 440, base station 445, cellular network 425, network 415, and server 420. Set-top box 405 communicates with smartphone 435 through the same bidirectional pathway.

Figure 5:
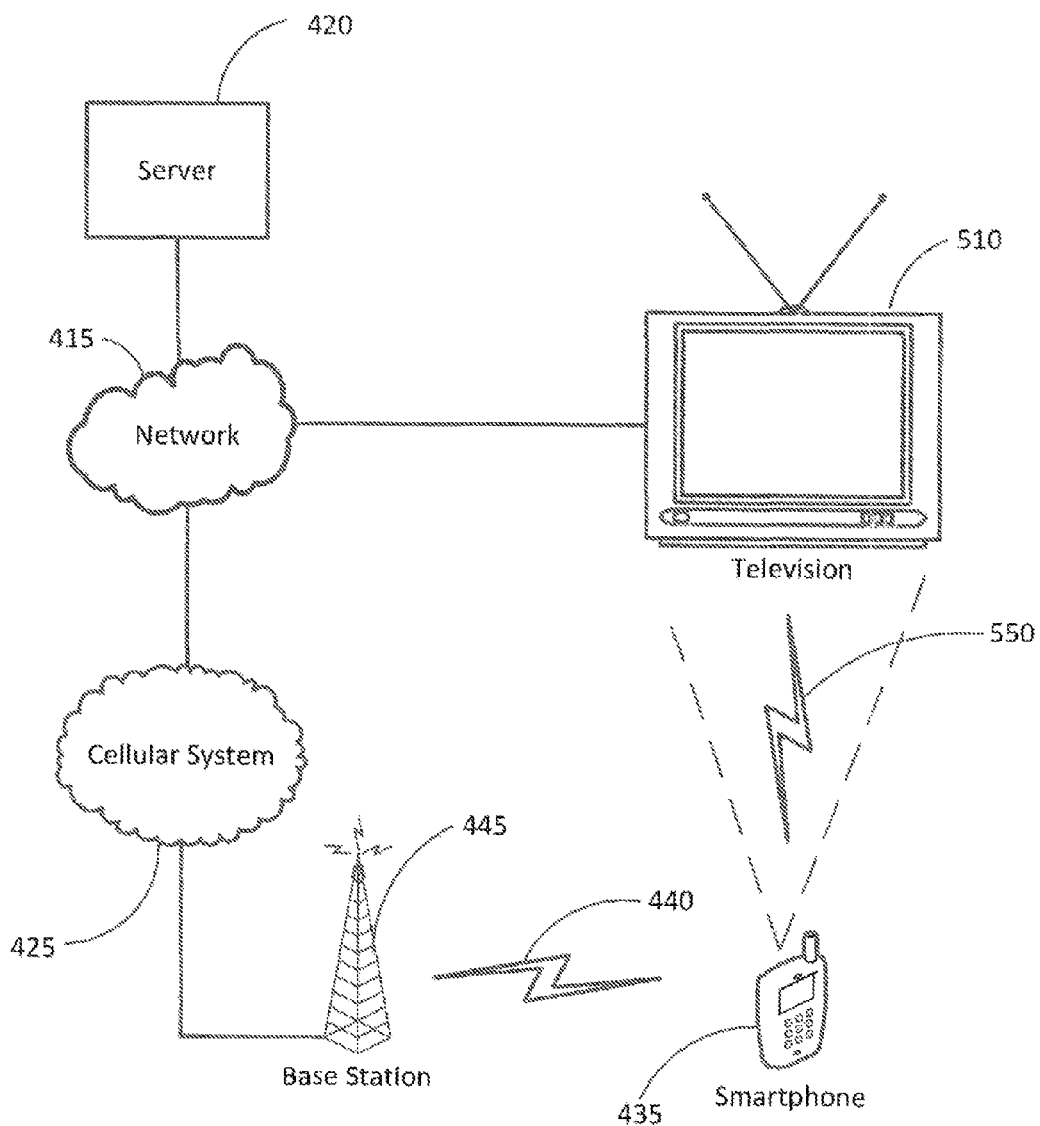
FIG. 5 illustrates an optical-based media controller with coupling initially through a server, according to one embodiment.

In one embodiment of optical-based media control system 100, as illustrated in FIG. 5, television 510 provides the functionality of media center 110, as described herein, including display 130, video appliance 140, and set-top box 120. The user retrieves or enters the identifying information of television 510 into smartphone 435. Smartphone 435 communicates with server 420 through network 415, cellular network 425, base station 445, and communication link 440 to establish a coupling with television 510.

Upon establishment of the coupling between smartphone 435 and television 510 through server 420, communications can occur directly between smartphone 435 and television 510 over communication link 550. Communication link 550 can be by any wired or wireless means. For example, the communication link 550 can be through and/or with a cloud, a LAN, a WAN, a PAN, radio, a network, Bluetooth, infrared, optical, acoustic, cellular, a hot spot, and combinations thereof.

Figure 6:
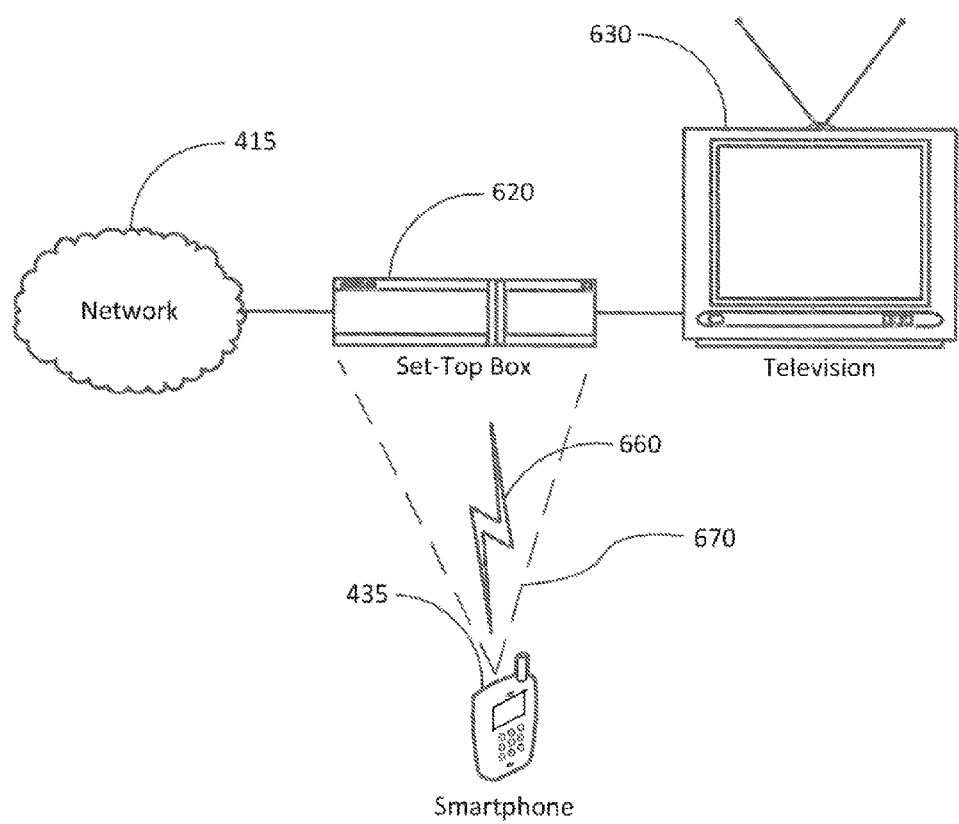
FIG. 6 illustrates an optical-based controller with direct coupling between a smartphone and television, according to one embodiment.

In one embodiment of motion-based media control system 100, as illustrated in FIG. 6, television 630 provides the functionality of display 130, as described herein. Set-top box 620 provides the functionality of set-top box 120 and video appliance 140, as described herein. Television 630 and set-top box 620 comprise the functionality of media center 110, as described herein. To establish a coupling between smartphone 435 and set-top box 620, the user enters the identifying information of set-top box 620 into smartphone 435. Smartphone 435 communicates directly with set-top box 620 through communication link 660 without the need of a remote server. For example, the communication link 660 can be through and/or with a cloud, a LAN, a WAN, a PAN, radio, a network, Bluetooth, infrared, optical, acoustic, cellular, a hot spot, and combinations thereof. Apps can execute on smartphone 435 and/or set-top box 620 to establish and maintain the coupling without having to communicate through an intermediary device. The user can control the functions of set-top box 620 and television 630 by motions or movements of smartphone 435 relative to set-top box 620 in field of view 670 after a coupling is established.

In some embodiments, controller 180 comprises a motion sensing device that responds to the body position and movements of the user of the motion-based controller 180B. The user's position and movements of motion-based controller 180B relative to the object can affect control of media center 110.

Figure 7:
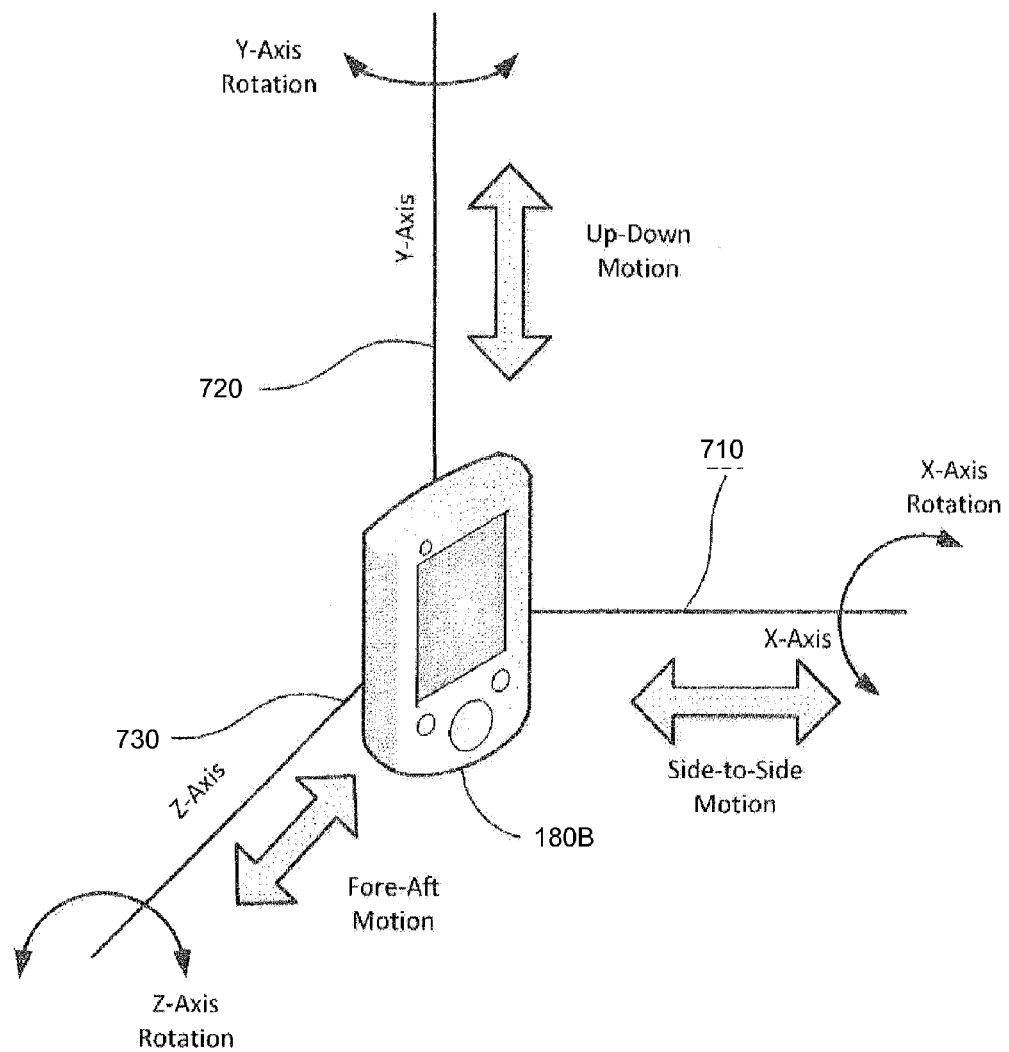
FIG. 7 illustrates a representation of movements of a motion-based controller, according to various embodiments.

The motions' of controller 180B relative to a Cartesian coordinate system that can enable media center functions to be performed are illustrated in FIG. 7. In various embodiments, motions or combination of motions can be described relative to any convenient coordinate system, such as, for example, Cartesian coordinate system, or a cylindrical coordinate system, or a spherical coordinate system, or any other three dimensional coordinate system. Controller 180B can move along or rotate about x-axis 710, y-axis 720, or z-axis 730. Controller 180B can move in any combination along an axis or in rotation about an axis. The functions controlled on media center 110 by controller 180B can be preset, preselected or can be user set or modified in the app on controller 180B or media center 110. The functions controlled on media center 110 by controller 180B can be selected by the user by performing the motion with controller 180B and specifying or entering one or more functions to be commanded by that motion, for example, a learning mode. The functions or operations controlled by user motions of controller 180B can depend on the functions and operations of media center 110 and it component devices. The functions and operations controlled by user motions of controller 180B can depend on the apps running on controller 180B. The functions and operations controlled by user motions of controller 180B can depend on the apps running on media center 110 or its component devices.

Figure 8:
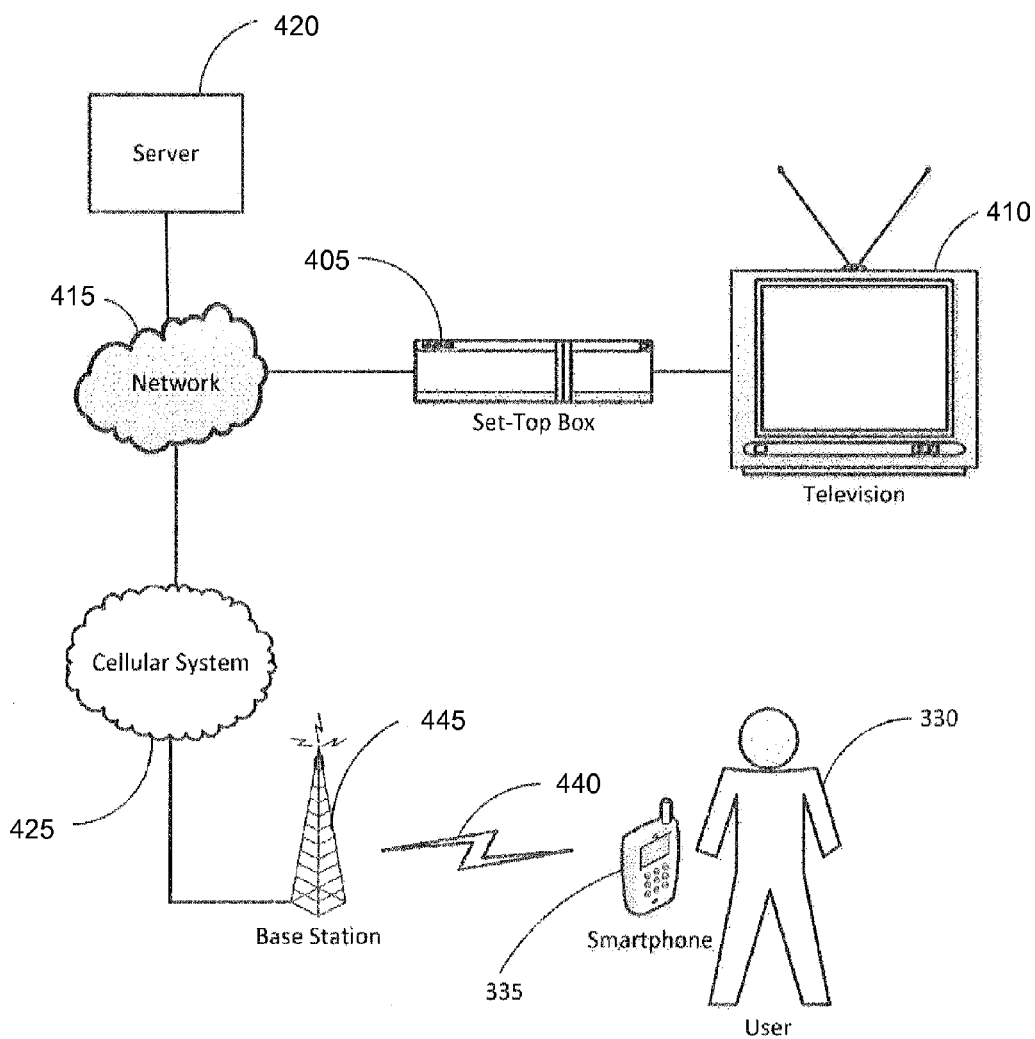
FIG. 8 illustrates a motion-based controller with coupling through a server, according to one embodiment.

In one embodiment of motion based motion control system 100, as illustrated in FIG. 8, television 410 provides the functionality of display 130, as described herein. Television 410 is coupled to set-top box 405. Set-top box 405 provides the video images for display on television 410. Television 410 and set-top box 405 comprise the functionality of media center 110, as described herein. Set-top box 405 is coupled to network 415 which can be a cable provider, satellite provider, Internet provider or any combination of these or other electronic connectivity services. Set-top box 405 obtains content, apps and data through network 415. Set-top box can provide video recording and playback capability.

Cellular system 425 and base station 445 provide the functionality of radio network 170, as described herein. Network 415 provides the functionality of network 150 and server 420 provides the functionality of server 160, as described herein. Smartphone 335 can provide the functionality of controller 180B, as described herein. User 330 establishes a coupling through smartphone 335 by retrieving or entering an address, location, or other information identifying set-top box 405. Smartphone 335 communicates with server 420 through wireless link 440, base station 445, cellular network 425, and network 415 to establish the coupling with set-top box 405. Through one or more apps running on smartphone 335, user 330 selects the functions or family of functions to control by movement of smartphone 335.

Motions of smartphone 335 by user 330 are translated into commands for set-top box 405. Smartphone 335 sends the commands to set-top box 405 through the coupling established by communication link 440, base station 445, cellular network 425, network 415, and server 420. Set-top box 405 communicates with smartphone 335 through the same bidirectional pathway.

Figure 9:
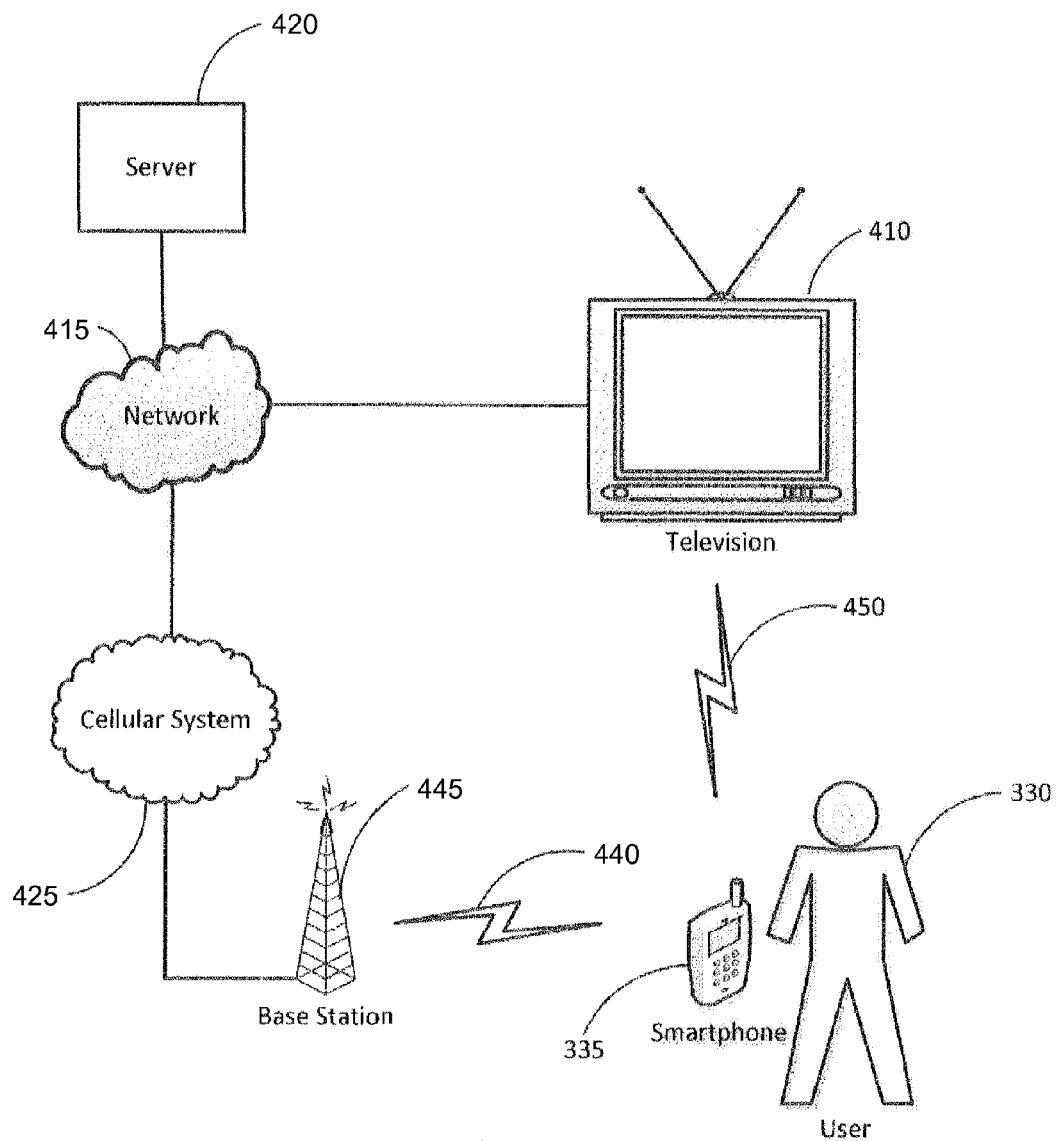
FIG. 9 illustrates a motion-based controller with coupling initially through a server, according to one embodiment.

In one embodiment of motion based motion control system 100, as illustrated in FIG. 9, television 510 provides the functionality media center 110, as described herein, including display 130, video appliance 140, and set-top box 120. User 330 retrieves or enters the identifying information of television 510 into smartphone 335. Smartphone 335 can provide the functionality of controller 180B, as described herein. Smartphone 335 communicates with server 420 through network 415, cellular network 425, base station 445, and communication link 440 to establish a coupling with television 510.

Upon establishment of the coupling between smartphone 335 and television 510 through server 320, communications can occur directly between smartphone 335 and television 510 over communication link 550. Communication link 550 can be by any wired or wireless means, as discussed herein.

Figure 10:
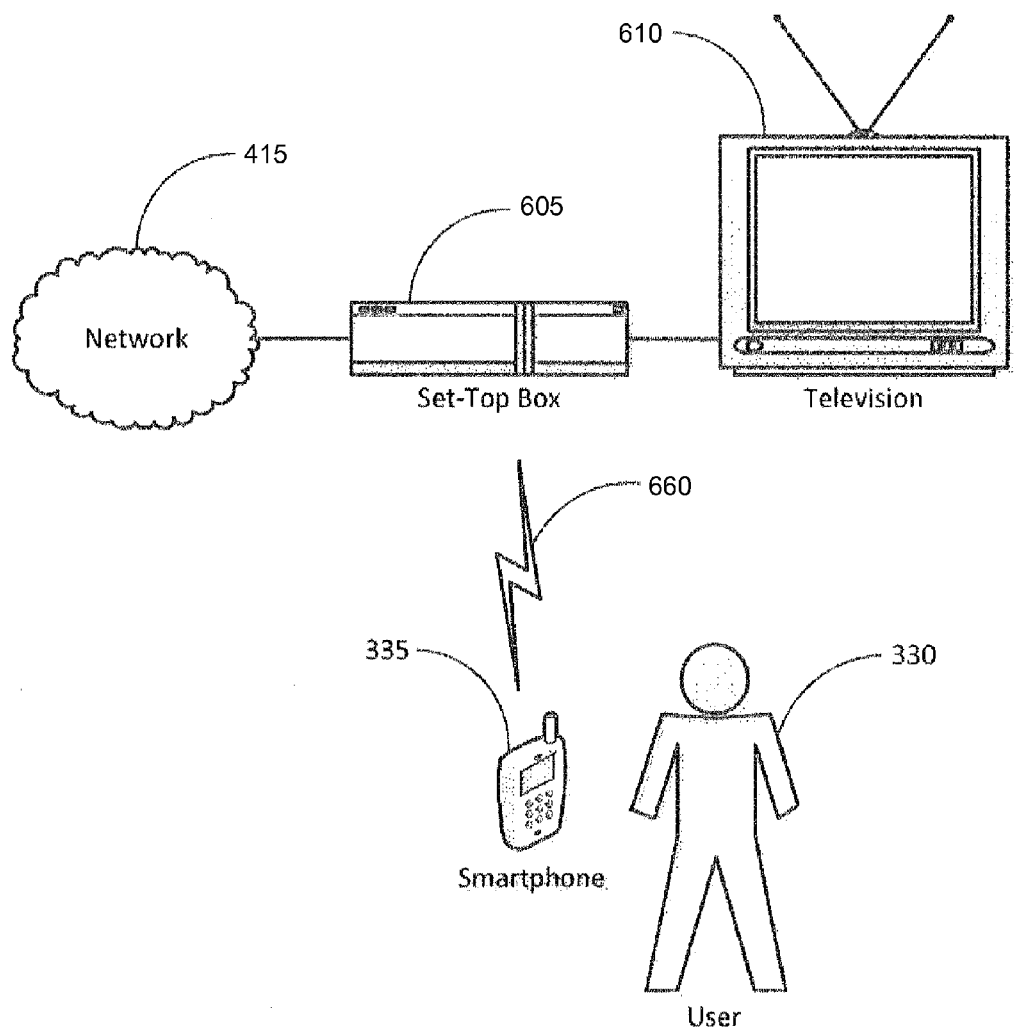
FIG. 10 illustrates a motion-based controller with direct coupling between a controller and a component within a media center, according to one embodiment.

In one embodiment of motion based motion control system 100, as illustrated in FIG. 10, television 630 provides the functionality of display 130, as described herein. Set-top box 620 provides the functionality of set-top box 120 and video appliance 140. Television 630 and set-top box 620 comprise the functionality of media center 110, as described herein. Smartphone 335 can provide the functionality of controller 180B, as described herein. To establish a coupling between smartphone 335 and set-top box 620, user 330 enters the identifying information of set-top box 620 into smartphone 335. Smartphone 335 communicates directly with set-top box 620 through communication link 660 without the need of a remote server. For example, the communication link 660 can be through and/or with a cloud, a LAN, a WAN, a PAN, radio, a network, Bluetooth, infrared, optical, acoustic, cellular, a hot spot, and combinations thereof. Apps can execute on smartphone 335 and/or set-top box 620 to establish and maintain the coupling without having to communicate through an intermediary device. User 330 can control the functions of set-top box 620 and television 630 by motions or movements of smartphone 335 after a coupling is established.

Various embodiments provide systems and methods for using a controller 180, such as those described herein, as a context-sensitive control surface with a two-way connection to a host, which allows context-sensitive reconfiguration of the control surface based on receiving a cue from the host. In some embodiments, controller 180 comprises application that responds to a cue sent from a host and changes the configuration of the control surface the user of the context-sensitive controller 180C.

For example, the control surface of controller 180C may have a first set of buttons and/or gestures to control a character in an environment of a video game. In this example, when the character moves to a second environment, a cue is transmitted from the host to app running in the controller 180C, which changes the control surface to a second set of buttons and/or gestures to control the character in the second environment.

In one embodiment, the control surface of controller 180C adapts to the context of the game. In other words, the changes the control surface as the game advances to different levels or as the user changes characters. In one embodiment, upon receipt of a cue by application in the controller, the buttons and/or gestures of the control surface rearrange to the needs of the environment of the media content.

Figure 11:
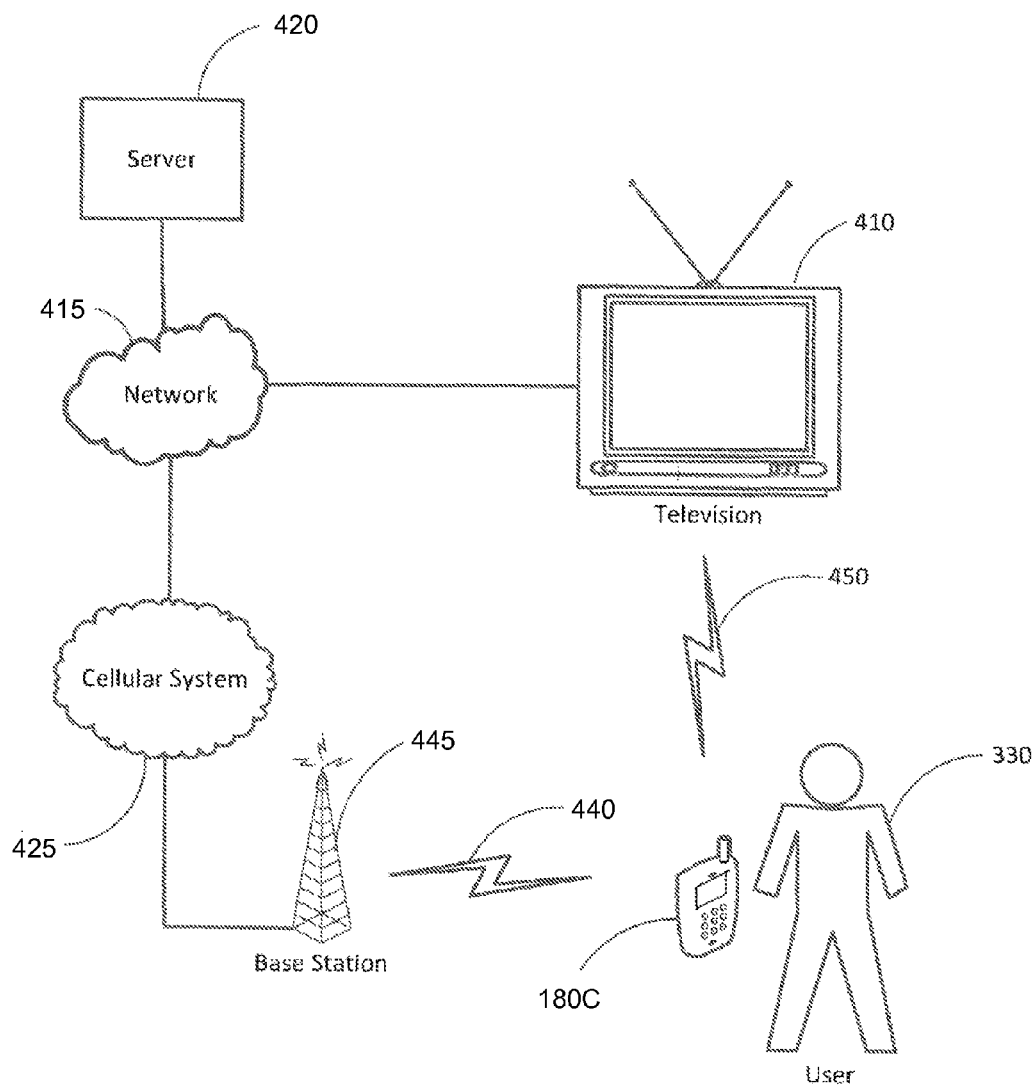
FIG. 11 illustrates a context-based controller with coupling initially through a server, according to one embodiment.

In one embodiment of control system 100, as illustrated in FIG. 11, television 510 provides the functionality media center 110, as described herein, including display 130, video appliance 140, and set-top box 120. User 330 retrieves or enters the identifying information of television 510 into controller 180C. Controller 180C can provide the functionality of controller 180, as described herein. In various embodiments, controller 180C can be a specific or universal remote control, keyboard, keypad, smartphone, media controller, touchpad, a mobile phone, a cellular phone, a PDA, a tablet computer, a netbook computer, a personal pocket computer, an iPad, an Android based tablet, or any similar device now known or developed in the future. Controller 180C communicates with server 420 through network 415, cellular network 425, base station 445, and communication link 440 to establish a coupling with television 510. In some embodiments, the controller 180C receives a cue from communication link 440, which is configured for two way communication. In some embodiments, the controller 180C receives a cue from communication link 450, which is configured for two way communications between television 510 and controller 180C. In one embodiment, controller 180C can receive a cue from either communication 440, when the cue is being transmitted from the network 415 or communication link 450, when the cue is being transmitted from the television 510.

Upon establishment of the coupling between controller 180C and television 510 through server 320, two-way communication can occur directly between controller 180C and television 510 over communication link 550. Communication link 550 can be by any wired or wireless means, as discussed herein.

Figure 12:
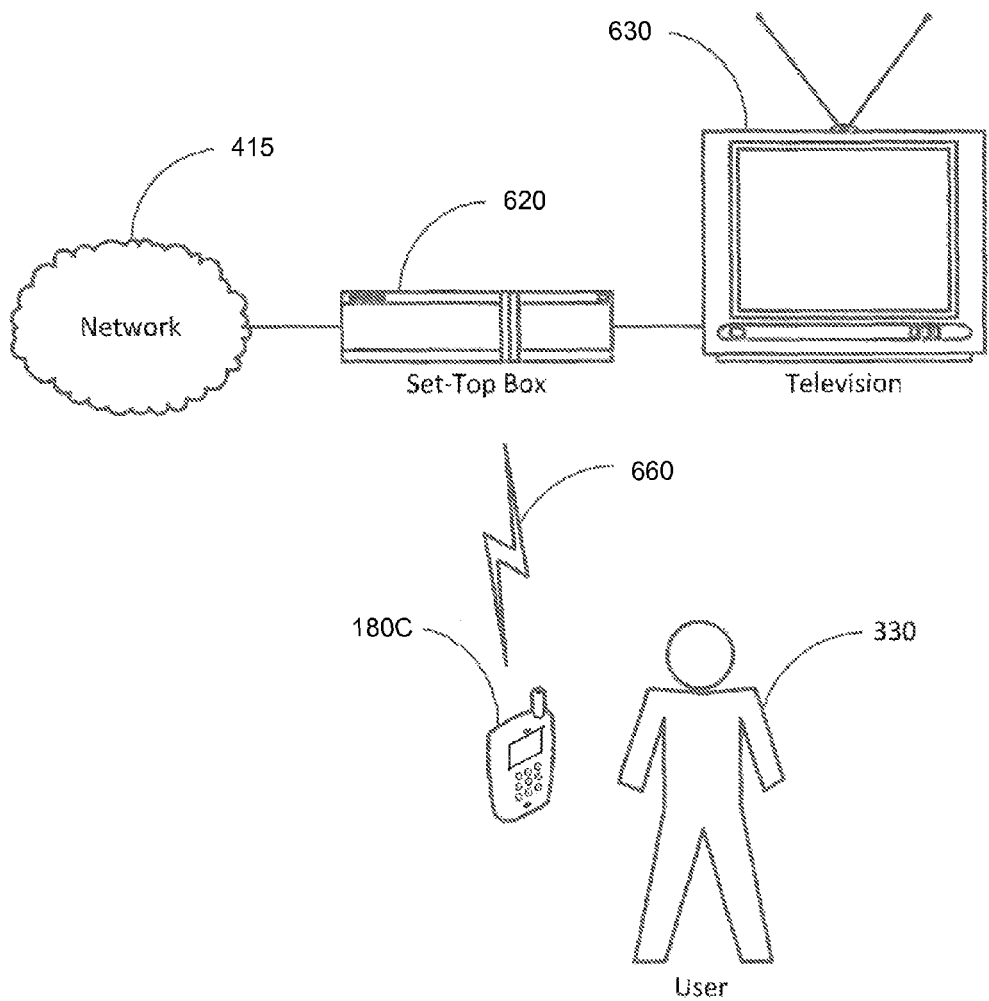
FIG. 12 illustrates a context-based controller with direct coupling between a controller and a component within a media center, according to one embodiment.

In one embodiment of control system 100, as illustrated in FIG. 12, television 630 provides the functionality of display 130, as described herein. Set-top box 620 provides the functionality of set-top box 120 and video appliance 140. Television 630 and set-top box 620 comprise the functionality of media center 110, as described herein; controller 180C can provide the functionality of controller 180, as described herein. To establish a coupling between controller 180C and set-top box 620, user 330 enters the identifying information of set-top box 620 into controller 180C controller 180C communicates directly with set-top box 620 through communication link 660, which can send a cue, without the need of a remote server. For example, the communication link 660 can be through and/or with a cloud, a LAN, a WAN, a PAN, radio, a network, Bluetooth, infrared, optical, acoustic, cellular, a hot spot, and combinations thereof. Apps can execute on controller 180C and/or set-top box 620 to establish and maintain the coupling without having to communicate through an intermediary device. User 330 can control the functions of set-top box 620 and television 630 by motions or movements of controller 180C after a coupling is established.

In various embodiments, controller 180 can comprise the functionality of any of controller 180A, controlled 80B, controller 180C, or combinations thereof. In one embodiment, controller 180 comprises both optical-based control and motion-based control. For example, motion based-control can used for courser movements on display and optical-based can be used for fine movements on display. In one embodiment, controller 180 comprises both optical-based control and context-sensitive control of the control surface. In one embodiment, controller 180 comprises both motion-based control and context-sensitive control of the control surface. In one embodiment, controller 180 comprises motion-based control, optical-based control, and context-sensitive control of the control surface. An haptic effect can be employed in any of the embodiments discussed above.

In various embodiments, controller 180 can comprise application to simulate a vehicle in racing games though the use of the touch screen on the controller. The control of the vehicle in the game can be accomplished by user preformed gestures such as, swipes and taps that are in turn are interpreted as maneuvers for the vehicle to perform. In one embodiment, the application to simulate a vehicle in racing games can comprise a learning mode so that a user can create personalize gestures to control the vehicle. In some embodiments, the application to simulate a vehicle in racing games can be interfaced with a motion control, such as, the functionality of optical-based controller 180A, or motion-based controller 180B, or a combination thereof. In one embodiment, the motion control of controller 180 can be used to steer the vehicle, while other gestures on the touch screen can be used to control other aspects of the vehicle. In some embodiments, the context-sensitive control of controller 180C can be used to provide a dashboard for the vehicle chosen by the user. The dashboard may be abstract or may be a simulation of the vehicle chosen by the user. In some embodiments, a combination of gestures can be designated for steering, acceleration, braking, and shifting of transmission.

In various embodiments, controller 180 can comprise application to control individual players in a sport themed video game though the use of the touch screen on the controller. The control of an individual player in the game can be accomplished by user preformed gestures such as, swipes and taps that are in turn are interpreted as maneuvers for the player to perform. In one embodiment, the application can comprise a learning mode so that a user can create personalize gestures to control the certain players. In some embodiments, the context-sensitive control of controller 180C can be used to provide a control surface configuration of a player with a particular skill set. For example, an individual player, such as, a quarterback would have a different control surface configuration than that of a kicker. In various embodiments, the can changed based on the individual player that the user decides to control through various gestures.

In some embodiments, the context-sensitive control of controller 180C can be used to provide reduction in the power of an individual player's skill due to changes in weather, injury, or field surface and/or slowly over the course of a game due to fatigue. In one embodiment, the context-sensitive controller can change control surface configurations due to a change in status of an individual player. For example, a defensive player may have a particular control surface configuration for a defensive position, however, upon an interception by that player, the control surface configuration for that player changes to control surface configuration of a running back, so that the user can control the player during a runback of the interception. In another example, a kicker may have a particular control surface configuration, which is specialized for the unique skills of a kicker, however, upon a gesture by the user to call a fake kick, the control surface configuration for the kicker changes to control surface configuration of a quarterback with reduced speed and arm strength.

Figure 13:
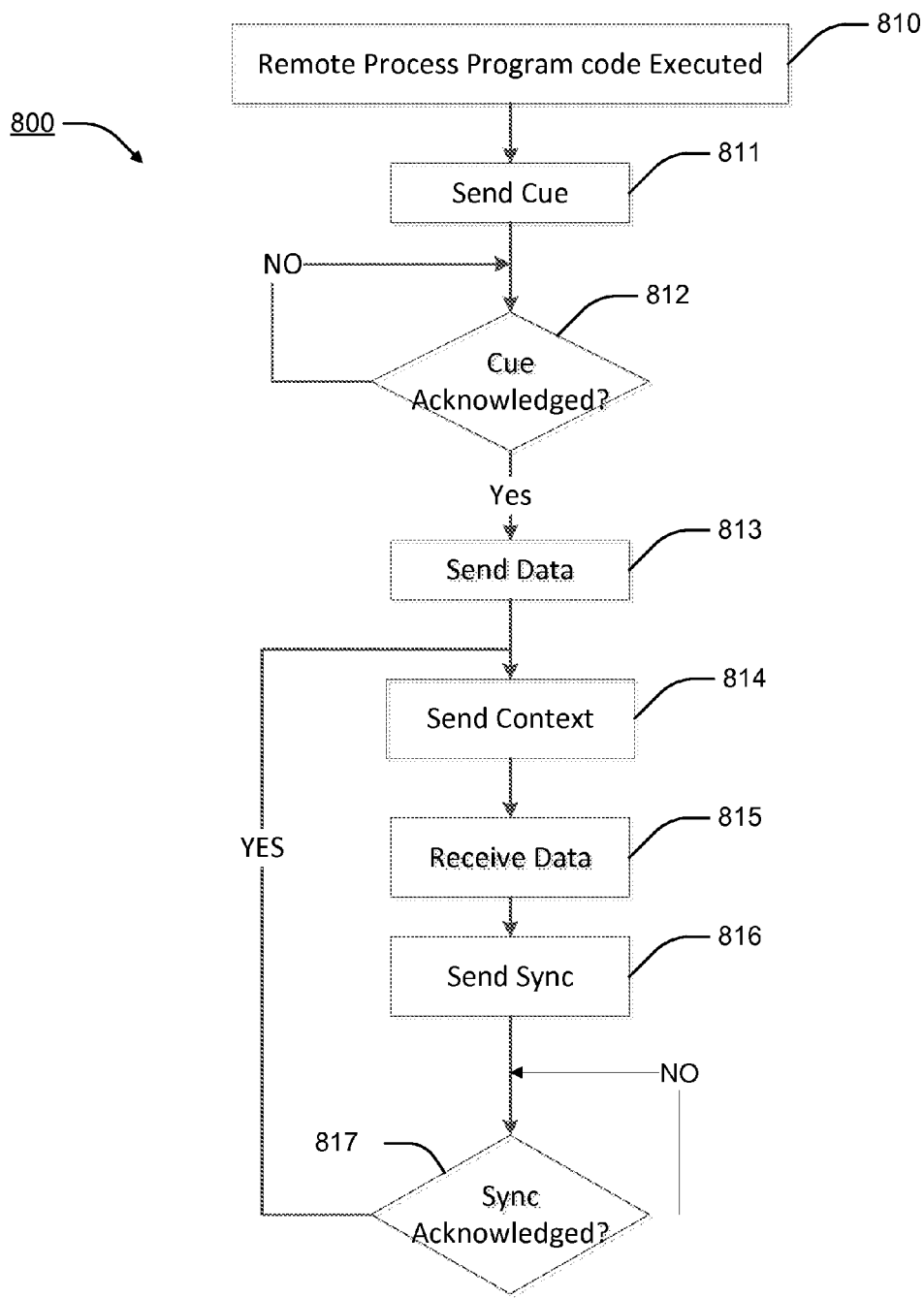
FIG. 13 is a flow chart illustrating a method, according to some embodiments.

Now moving to FIG. 13, a method for communicating with a controller is illustrated, in accordance with various embodiments. Method 800 can comprise a variety of steps for communicating with a controller, such as, controller 180, controller 180A, controller 180B, controller 180C, or controller 1114. In some embodiments, method 800 begins with a Program Code Executed 801 on a host, to Send Cue 802 to the controller. A cue, can be any cue, as described herein or is known by those skilled in the art, or is developed in the future. The next step is Cue Acknowledged? 803, if NO, Send Cue 802 again. If YES, the host will then Send Data 804 to the controller. The host will then Send Context 805, which can be a context of a game or any context from media content, such as, for example, but not limited to context, as described herein. The controller is then set to Receive Data 805 and Send Sync 806 by controller to host. The next step is Sync Acknowledged? 807, if NO, Send Sync 806 again. If YES, then host will continue Send Context 805 to controller.

In some embodiments, method 800 can provide a context-sensitive control surface with a two-way connection to a host, to allow context-sensitive reconfiguration of the control surface based on receiving a cue from the host. In an example of method 800, the control surface may have a first set of buttons and/or gestures to control a character in an environment of a video game. In this example, when the character moves to a second environment, a cue is transmitted from the host to the controller which changes the control surface to a second set of buttons and/or gestures to control the character in the second environment.

Figure 14:
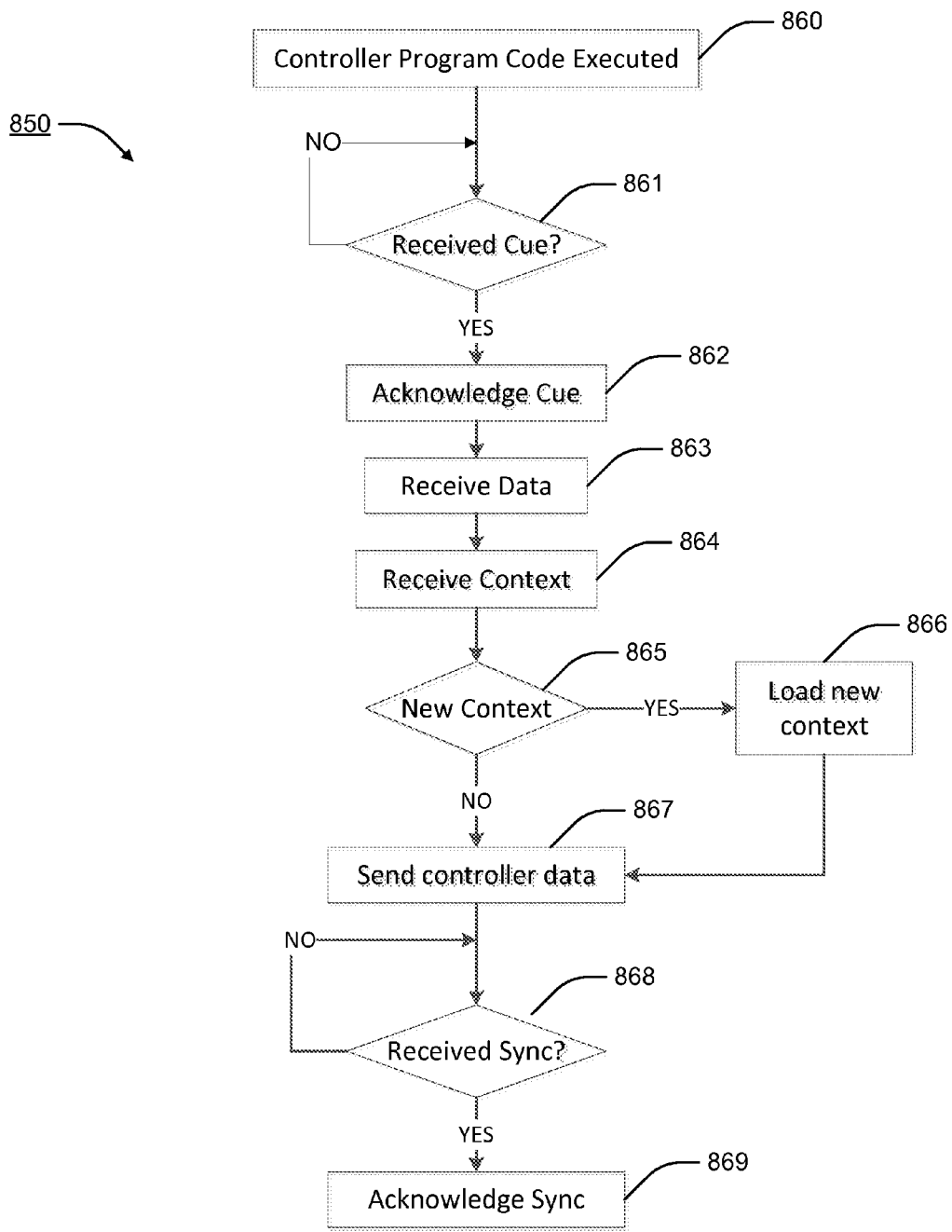
FIG. 14 is a flow chart illustrating a method, according to some embodiments.

With reference to FIG. 14, method for communicating with a controller is illustrated, in accordance with various embodiments. Method 850 can comprise a variety of steps for communicating with a controller, such as, controller 180, controller 180A, controller 180B, controller 180C, or controller 1114. In some embodiments, method 850 begins with Controller Program Code Executed 851 to receive a cue from a host. The next step is Received Cue? 852, if NO then continue to Receive Cue 852 from host. If YES, then the controller will Acknowledge Cue 853 and Receive Data 854 from host. The controller will Receive Context 855. The next step is New Content? 856, if NO then Send Controller Data 857 to host. If Yes, then the controller will Load New Context 858, then Send Controller Data 857 to host. The next step is Received Sync? 859 from the host, if NO then Send Controller Data 857 to host again. If YES, then Acknowledge Sync 860 for host and then Receive Context 855.

In some embodiments, method 850 can provide a context-sensitive control surface with a two-way connection to a host, to allow context-sensitive reconfiguration of the control surface based on receiving a cue from the host. In an example of method 850, the control surface may have a first set of buttons and/or gestures to control a character in an environment of a video game. In this example, when the character moves to a second environment, a cue is transmitted from the host to the controller which changes the control surface to a second set of buttons and/or gestures to control the character in the second environment.

In various embodiments, media synchronization system 1100, as illustrated in FIGS. 15-19, performs the functions and/or achieves the results of the media synchronization system and method discussed above. Media synchronization system 1100 can include content provider 1102, content delivery path 1104, media center 1106, controller 1114, network 1116, and server 1118. Media synchronization system 1100 can include interface 1108, which can provide a communication link between media center 1106 and controller 1112. Content provider 1102 can be any organization or individual that provides media content, as described herein. For example, content provider 1102 can provide information, education, entertainment, software application (or "app") or reference material deliverable or retrievable in an audio and/or video format. Content provider 1102 can provide content through, for example, a computer server, such as a computer program running a service, or a computer dedicated to running a service, hardware/software system.

Content delivery path 1104 provides a coupling between the content provider and a media center. For example, content delivery path 1104 can include, inter alia, satellite service, cable provider, over-the-air transmission, the Internet, the cloud, microwave transmission, fiber optics, and/or other direct or store and forward transmission methods.

Media center 1106 can be any audio-visual software applications, devices, or dedicated player devices for viewing and/or listening to media content such as, inter alia, a television, home theatre, entertainment system, media computer, cinema, or movie theater. Media center 1106 can include a set-top box, display, and/or video appliance. The functions of the set-top box, display and video appliance can be combined in any combination into one or more devices, or functions can be omitted without affecting the functions or results achieved with the present invention.

Controller 1114 can couple with media center 1106 and network 1116, can record responses by the user, and detect synchronization cues or markers. The synchronization cues can be inserted into, embedded in, or selected existing audio and/or visual information in, the media content by content provider 1102, along content delivery path 1104, or by media center 1106. Cues can be aural or visual. For example, aural cues can include tones, sequences of sounds, or other audible or inaudible signals. Visual cues can include indications such as distinctive patterns, colors, images, shapes and/or combination of effects. Controller 1114 can include a microphone and/or camera. An app executed by controller 1114 can detect one or more cues contained within the media content using the microphone and/or camera. Controller 1114 can be responsive to aural and/or visual cues presented by media center 1106 over interface 1108. The user operates controller 1114 through user interface 1112 by enabling the app and, for example, pointing the camera in controller 1114 toward the display in media 1106 to acquire the visual image. The app analyzes the visual image and/or aural signals for predefined cues. Interface 1108 can be the space between controller 1114 and media center 1106 over which the audio and video information in the media content is presented to the user. Controller 1114 can be any device that provides the functionality described herein, such as, for example, a Smartphone, mobile phone, cellular phone, personal digital assistant, tablet computer, netbook computer, personal pocket computer or universal remote. In various embodiments, controller 1114 can comprise the functionality of any of controller 180, controller 180A, controller 180B, controller 180C, or combinations thereof.

Network 1116 can be a system of interconnected computers such as the Internet. Network 1116 couples controller 1114 to server 1118. Network 1116 can couple to controller 1114 through an interface, such as, a cellular provider, wireless local area network or other communications protocol, such as, for example, WiFi™, WiMax, Bluetooth®, HiperLAN, or IrDA, or wired connection. Network 1114 can use standards or common protocols such as TCP/IP for communications to, from, or within the network.

Server 1118 can be a computer with programs running one or more services to serve the needs or requests of other programs. The other programs can be located on server 1118 or on other computers or devices. Server 1118 couples to network 1116 and provides a repository for the time interval information and user response provided by one or more apps running on controller 1114. Server 1118 can also function as, or be co-located with, content provider 1102.

Figure 16:
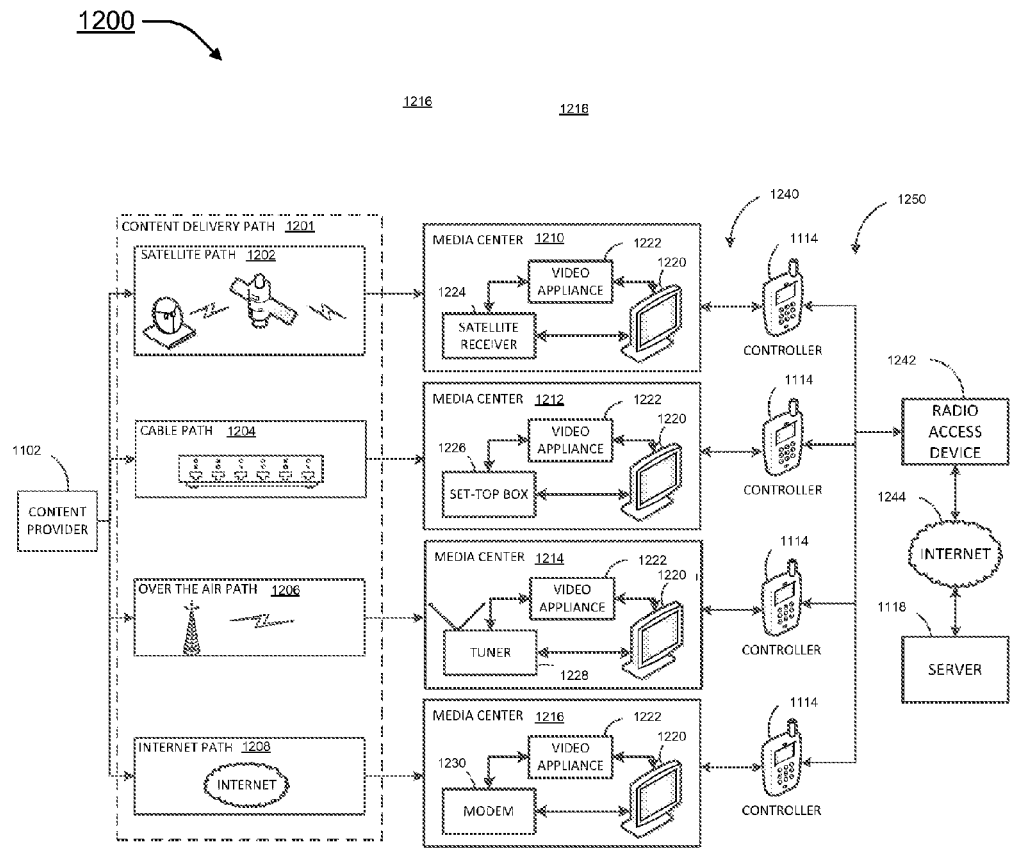
FIG. 16 illustrates a media synchronization system of FIG. 15.

One embodiment of system 1100, as illustrated by media synchronization system 1200 in FIG. 16, provides the functionality or achieves the results of media synchronization, as described herein. Media synchronization system 1200 includes content provider 1102, content delivery paths 1201, media centers 1210, 1212, 1214, and 1216, controllers 1114, radio access device 1242, and server 1118.

Content provider 1102 provides the media content, as described herein, and couples to content delivery paths 1201 which, in turn, can deliver the content to media centers 1210 or other destinations. Satellite path 1202, cable path 1204, over the air path 1206 and Internet path 1208 are implementations of content delivery paths 1201. Satellite path 1202 couples to content provider 1102 and provides an uplink to one or more satellites. The satellites disseminate the media content to receivers 1224 coupled to media centers 1210. Cable path 1204 couples to content provider 1102 and distributes the media content through cable, such as, wires, coaxial cable, or optical fibers. Over the air path 1206 provides terrestrial transmission of media content from coupled content provider 1102 using radio waves.

Media center 1210 couples to satellite path 1202 and can include display 1220, video appliance 1222, and satellite receiver 1224. The functions of satellite receiver 1224, video appliance 1222, and display 1220 can be combined in any combination into one or more devices.

Video appliance 1222 can provide record, storage, playback and distribution capability. Video appliance 1222 can include a digital video recorder (DVR), video distribution controller, video player, such as, for example, a video cassette recorder, DVD or Blu-Ray player, media computer, audio/video server or other audio and video functionality. In some embodiments, video appliance 1222 can have the capability of receiving and executing apps.

Display 1220 provides the user with visual images. Display 1220 can be of any display type or technology, such as, for example, a television, a monitor, a computer display, a projector, a cathode ray tube (CRT), a front projection, a rear projection, a plasma, a liquid crystal display (LCD), a light emitting diode (LED), a digital light processing (DLP). Display 1220 can be of any size, resolution or refresh rate.

Satellite receiver 1224 can also provide connectivity from controller 1114, described below, to content provider 1102 and/or Internet 1244. Media center 1212 couples to cable path 1204 and can include display 1220, video appliance 1222 and set-top box 1226. The functions of display 1220, video appliance 1222 and set-top box 1226 can be combined in any combination into one or more devices. Set-top box 1226 can receive media content and apps through cable path 1204 from content provider 1102 and/or Internet 1244. Set-top box 1226 provides equivalent functionality through cable path 1204 as satellite receiver 1224 through satellite path 1202 as described herein.

Media center 1214 couples to over the air path 1206 and can include display 1220, video appliance 1222 and tuner 1228. The functions of display 1220, video appliance 1222 and tuner 1228 can be combined in any combination into one or more devices. Tuner 1228 can receive media content and apps through over the air path 1206 from content provider 1102 and/or Internet 1244. Tuner 1228 provides equivalent functionality through over the air path 1206 as satellite receiver 1224 through satellite path 1202, as described herein.

Media center 1216 couples to Internet path 1208 and can include display 1220, video appliance 1222 and modem 1230. The functions of display 1220, video appliance 1222 and modem 1230 can be combined in any combination into one or more devices. Modem 1230 can receive media content and apps through Internet path 1206 from content provider 1102 and/or Internet 1244. Modem 1230 provides equivalent functionality through Internet path 1208 as satellite receiver 1224 through satellite path 1202, as described herein.

As described herein, the functions of the devices in media center 1210, 1212, 1214, or 1216 can be combined into one or more devices. Alternatively, functions can be omitted for cost or other reasons without affecting the performance of the present invention. For example, an Internet-enabled digital television can provide the functionality of set-top box 1226, video appliance 1222 and display 1220 in a single unit. Alternatively, a digital video recording receiver can provide the functionality of set-top box 1226 and video appliance 1222 in a single device.

Controller 1114 couples to media center 1210, 1212, 1214 or 1216 over interface 1240 and to radio access device 1242 over interface 1250. Controller 1114 detects aural and/or visual cues over interface 1240 in media content presented by media center 1210, 1212, 1214, or 1216, as described herein. Apps executed by controller 1114 identify one or more cues and record user responses and time intervals between the cues and responses. Controller 1114 can establish a connection with server 1118 through radio access device 1242 and Internet 1244 to exchange information such as apps, identification of media content, type of cue in the media content, cue identification parameters, time synchronization between controller and server, and/or user response.

Radio access device 1242 couples to controller 1114 and Internet 1244. A cellular telephone network can perform the functions of radio access device 1242 if controller 1114 includes a cellular or smartphone. Interface 1250 can be a wireless local area network interface such as WiFi coupling, for example, a WiFi enabled controller 1114 with radio access device 1242. In another implementation, controller 1114 can couple over, for example, a radio or infra-red interface with media center 1210, 1212, 1214 or 1216 providing connectivity through the content delivery path to the Internet 1244.

Internet 1244 couples with server 1118 and with radio access device 1242 or content delivery paths 1201, as described herein. Server 1118 exchanges information with controller 1114 to provide apps, media synchronization and recordation of user responses.

In operation, cues or markers can be inserted or embedded in media content during content creation, at the content provider, along the content delivery path or by the media center. One or more apps on the controller 1114 can be configured with the information to identify the cues in the media content, and to align the controller's internal clock with the server 1118, to record and communicate the time of cue detection and the interval between detection and user response with the server 1118. Apps to perform media synchronization can be executed on the content provider 1102, content delivery paths 1201, media center, and/or server 1118.

The timing diagrams in FIG. 17 illustrate the time intervals of system 1100. The content cue represents the time a reference marker is inserted or defined in the media content. The receive cue represents the time the cue is received at the media center. The display cue represents the time the cue is presented in the media content to the user, and the response is the time the user enters a response into the controller 1114.

For example, time interval 1302 in FIG. 17A represents the time from the reference cue in the provided content to the time it is received by the media center. Time interval 1302 can be due to transmission delays such as time shifting, propagation delays or other factors. Time interval 1304 represents the time from receipt of the media content by the media center to the time the content is presented to the user. Time interval 1304 can represent processing delay by the media center or can include time shifting initiated by the user. Time interval 1306 represents the time from presentation of the media to the time the user enters a response or command into the controller 1114. The time interval that can be sent to and utilized and/or recorded by the server can be time interval 1306.

The time interval 1312, from content cue to receive cue, is longer in FIG. 17B then the corresponding time interval 1302 in FIG. 17A. This can be due to, for instance, media content received by a satellite delivery path and broadcast sooner on the East Coast then on the West Coast. FIG. 17B can represent the delayed transmission of media content. Upon receipt of the media content, the system illustrated by the timing diagram in FIG. 17B can present the media with slight delay as shown by time interval 1314. In this example, user response as indicated by time interval 1316 can be shorter than user response time interval 1306.

In another example, the media content and cue are received relatively quickly in the timing diagram illustrated in FIG. 17C. In this example, the user can record the media for presentation at a later time as indicated by time interval 1324. Time interval 1326 represents the time period from presentation of the media content to response by the user.

Accordingly, such controllers may require relatively high bandwidth and low latency bidirectional and/or other supportive communication protocol with the host, for example, a gaming console, another computer executing game application, the cloud, a network connected to a server, or the like. If latency is too high the controller may be nonresponsive. According to various embodiments, controller described herein may be synchronized to adjust for latency. In one embodiment, the synchronization can be an update, which may be just a ping provided from the host or may be a particular gesture, which would describe the ping, which would be used for calibration. In one embodiment, the host has a constant measure of latency based on variations in network speed and adjusts sensitivity of the controller to best fit latency in real-time matter. In one example, latency may be tested every time a particular button on a control surface is utilized, in such an embodiment of this example, the shoot button may shoot at a target on the display of a video game and may also re-calibrate the sensitivity of the controller based on latency.

A method of synchronizing controller 1114 with media content can be based on the measurement of time between detection of synchronization cues and user response. In various embodiments, method 1400, as illustrated in FIG. 18 can provide input media content 1402, and processes detect cues 1404 and record responses 1406.

Each process of method 1400 can perform its functions whenever sufficient input information is available. For example, processes can perform their functions serially, in parallel, simultaneously, or in an overlapping manner. A system, such as, for example, but not limited to system 1100, performing method 1400 can implement one or more processes in any combination of programmed digital processor logic circuits and/or analog control circuits. Inter-process communication can be accomplished in any conventional manner, such as, for example, subroutine calls, pointers, stacks, common data areas, messages, interrupts, asynchronous signals, synchronous signals. For example, method 1400 can be performed by system 1100, which may perform one or more other functions.

Detect cues process 1404 analyzes audio and/or video information provided by media content input 1402. Cues can be predefined aural signals and/or visual cues inserted in the media content, or they can be preselected aural and/or visual contained within the media content. The time of detection of each of one or more cues is recorded by the process and provided to record responses process 1406.

Record responses process 1406 accepts the user's responses and records the response, time of response, and/or time of the cue detection. Recording can be performed on controller 1114 and/or sent to server 1118 for further processing.

One embodiment of system 1100 is illustrated in FIG. 19, as media synchronization system 1500 with content provided over the Internet. Server 1502 provides the functionality of content provider 1102 and server 1118, as described herein, by providing the media content, apps, time reference, and recordation of the time intervals reported through Smartphone 1514, which is one embodiment of controller 1114.

Network 1504 provides the functionality of content delivery path 1104 and network 1116, as described herein. Typically, the Internet can be used as network 1504. Television 1510 can be a television with Internet connectivity and functionality performing the functions of media center 1106, as described herein. Smartphone 1514 may include a microphone and camera, and can perform the functions of controller 1114, as described herein. Smartphone 1514 couples with cellular system 1506 through base station 1508 and interface 1512. Cellular system 1506 couples with network 1504 providing a path from smartphone 1514 to server 1502. Smartphone 1514 can also couple with server 1502 through network 1504, television 1510 and interface 1516. In another example, the functions of Smartphone 1514 may be performed by a remote controller coupling with server 1502 through network 1504 and television 1510.

Media content can be provided from server 1502 at scheduled or unscheduled times, such as, on demand programming. Content can be selected or requested by user control of television 1510 or smartphone 1514. Synchronization cues can be inserted by server 1502, network 1504, or television 1510. Smartphone 1514 may perform other functions in addition to media synchronization such a control of television 1510 and/or running conventional Smartphone applications.

Upon establishment of the coupling between smartphone 1514 and television 1510 through server 1502, communications can occur directly between smartphone 1514 and television 1510 over interface 1516. Interface 1516 can be by any wired or wireless means. For example, interface 1516 can be through and/or with a cloud, a LAN, a WAN, a PAN, radio, a network, Bluetooth, infrared, optical, acoustic, cellular, a hot spot, and combinations thereof.

As used herein, the terms "comprise", "comprises", "comprising", "having", "including", "includes" or any variation thereof, are intended to reference a non-exclusive inclusion, such that a process, method, article, system, composition or apparatus that comprises a list of elements does not include only those elements recited, but may also include other elements not expressly listed or inherent to such process, method, article, system, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

In the foregoing specification, the invention has been described with reference to specific embodiments. Various modifications and changes may be made, however, without departing from the scope of the various embodiments of the present invention, as set forth in the claims. The specification and Figures are illustrative, rather than restrictive, and modifications are intended to be included within the scope of any of the various embodiments of the present invention described herein. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus or system claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The invention claimed is:

1. An optical-based media control system comprising an optical-based controller comprising a touch screen and an image sensor on a surface opposite to the touch screen, a media center comprising a display and a network in communication with the media center and a server the optical-based controller comprising:
   a first communication linked operated by the optical-based controller and configured for communication between the optical-based controller and the display;
   a second communication link operated by the optical-based controller and configured for communication between the optical-based controller and the server;
   an application configured to execute on the optical-based controller and to capture images, using the first communication link, of the display in relation to movement of the optical-based controller, to calculate movement coordinates from the images, and to send the movement coordinates, using the second communication link, to the server.

2. The control system according to claim 1, further comprising a media content residing on the server and configured for delivery, over the network, to the media center, and the movement coordinates received by the server effect a feature in the media content.

3. The control system according to claim 2, wherein the media content is a streaming video game and the feature is a movement on the display of least one of a character and an object in the video game.

4. The control system according to claim 2, wherein the optical-based controller further comprises a motion sensor configured to communicate movement in three dimensional space of the optical-based controller, over the second communication link, to the server, and the movement received by the server effect a second feature in the media content.

5. The control system according to claim 1, wherein the application is configured to provide an interactive game controller layout on a touch screen of the optical-based controller.

6. The control system according to claim 1, further comprising a cue configured to be sent over the set over the first communication link and received the optical-based controller.

7. The control system according to claim 6, wherein in the optical-based controller is configured receive the cue and adjust at least one feature to compensate for a change in system latency.

8. A method of controlling a feature on a display of a media system, the method comprising:
   providing an application on a smart device comprising a touch screen and an image sensor on a surface opposite of the touch screen;
   executing the application to engage a first communication link between the image sensor and a display of a media system;
   executing the application to capture images, over the first communication link, with the image sensor of a display of a media system in relation to movement of the smart device;
   calculating movement coordinates from the images using the application;
   executing the application to engage a second communication link between the smart device and a host;
   sending the movement coordinates, over the second communication link, to a host; and
   receiving from the host an effect to a feature on the display.

9. The method according to claim 8, further comprising providing media content from the host to the display, wherein the host and the display are coupled to a network; and wherein the media content is a streaming video game and the feature is at least one of a character and an object in the video game.

10. The method according to claim 8, further comprising executing the application to provide an interactive game controller layout on the touch screen.

11. The method according to claim 10, wherein interactive game controller layout on the touch screen comprises set of buttons and/or gestures to control a character in an environment of a video game.

12. The method according to claim 8, further comprising receiving, in the application, a cue sent by the media content over the first communication link.

13. The method according to claim 12, further comprising executing the application to adjust at least one feature on the smart device to compensate for a change in system latency, upon the receiving the cue.

14. The method according to claim 12, further comprising, upon the receiving the cue, executing the application to change a first set of buttons and/or gestures to control a character in an environment of a video game to a second set of buttons and/or gestures to control the character in a second environment.

15. The method according to claim 12, further comprising, upon the receiving the cue, executing the application to reconfigure an interactive game controller layout of the smart device, wherein interactive game controller layout is a context-sensitive control surface with a two-way communication with the host over the second communication link.

16. The method according to claim 8, wherein the smart device further comprises a motion sensor and the application is configured capture movement coordinates of the smart device.

17. The method according to claim 16, further comprising
   executing the application to capture movement coordinates of the smart device;
   calculating movement coordinates from the movements;
   sending the movement coordinates, over the second communication link, to the host; and
   receiving from the host a second effect to the feature on the display.

18. The method according to claim 17, wherein the second effect to the feature on the display is a movement of at least one of a character and an object on the display.

19. The method according to claim 8, wherein the effect to the feature on the display is a movement of at least one of a character and an object on the display.

20. The method according to claim 8, wherein the host is a server or a cloud.

* * * * *